US012567797B2

(12) United States Patent
Zhan et al.

(10) Patent No.: US 12,567,797 B2
(45) Date of Patent: Mar. 3, 2026

(54) POWER CONVERSION DEVICE

(71) Applicant: Huawei Digital Power Technologies Co., Ltd., Shenzhen (CN)

(72) Inventors: Jinxiang Zhan, Shanghai (CN); Kai Gao, Shanghai (CN); Juncan Wang, Shanghai (CN); Yongbing Gao, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 154 days.

(21) Appl. No.: 18/582,873

(22) Filed: Feb. 21, 2024

(65) Prior Publication Data

US 2024/0297576 A1 Sep. 5, 2024

(30) Foreign Application Priority Data

Mar. 2, 2023 (CN) .......................... 202310234294.3

(51) Int. Cl.
H02M 1/32 (2007.01)
H02M 3/158 (2006.01)
*H02J 3/38* (2006.01)

(52) U.S. Cl.
CPC ........... H02M 1/322 (2021.05); H02M 3/158 (2013.01); *H02J 3/38* (2013.01); *H02J 2300/24* (2020.01)

(58) Field of Classification Search
CPC .............................. H02M 1/322; H02M 3/158
See application file for complete search history.

(56) References Cited

U.S. PATENT DOCUMENTS

| | | | | |
|---|---|---|---|---|
| 2012/0019178 A1* | 1/2012 | Kono | ..................... | B60L 7/14 |
| | | | | 318/400.3 |
| 2015/0171767 A1* | 6/2015 | Odaka | .................. | H02H 7/122 |
| | | | | 363/131 |
| 2020/0366236 A1* | 11/2020 | Xu | .......................... | H02J 3/32 |

FOREIGN PATENT DOCUMENTS

| CN | 201282334 Y | 7/2009 |
|---|---|---|
| CN | 201523229 U | 7/2010 |
| CN | 102780388 A | 11/2012 |
| CN | 113097987 A | 7/2021 |

(Continued)

OTHER PUBLICATIONS

Gayathri Devi et al, "Comparative Study on Different Five Level Inverter Topologies", Electrical Power and Energy Systems, Elsevier Ltd., XP029044683, vol. 63, Jul. 3, 2014, 10 pages.

*Primary Examiner* — Gary A Nash
(74) *Attorney, Agent, or Firm* — Maier & Maier, PLLC

(57) ABSTRACT
A power conversion device includes a positive direct current bus, a negative direct current bus, a first capacitor, a second capacitor, a first inductor, a first discharge unit. The first capacitor is connected between the positive direct current bus and the negative direct current bus. The second capacitor is connected in series to the first inductor and then connected in parallel to the first capacitor, where a capacitance value of the second capacitor is greater than a capacitance value of the first capacitor. The first discharge unit is connected in parallel to the first inductor, and is configured to be in a conducted state when a voltage of the first inductor is greater than a first action voltage threshold. In the embodiments, a case in which a semiconductor device in the power conversion device has a risk of voltage overstress caused by a differential mode lightning strike can be avoided.

20 Claims, 23 Drawing Sheets

(56) References Cited

FOREIGN PATENT DOCUMENTS

| CN | 223391098 U | 9/2025 | |
| WO | WO-2015113304 A1 * | 8/2015 | ............ H02M 5/458 |

* cited by examiner

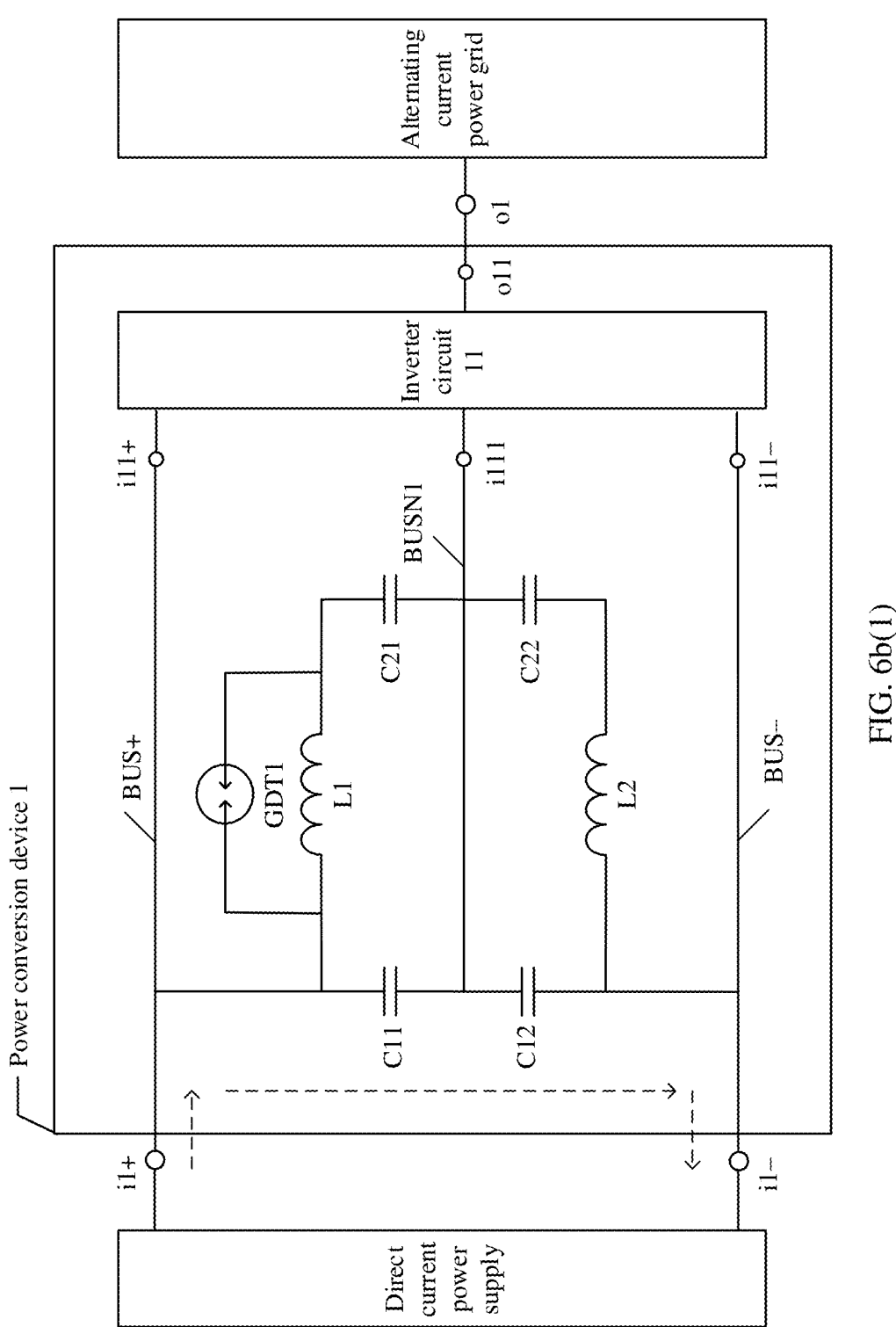
FIG. 6b(1)

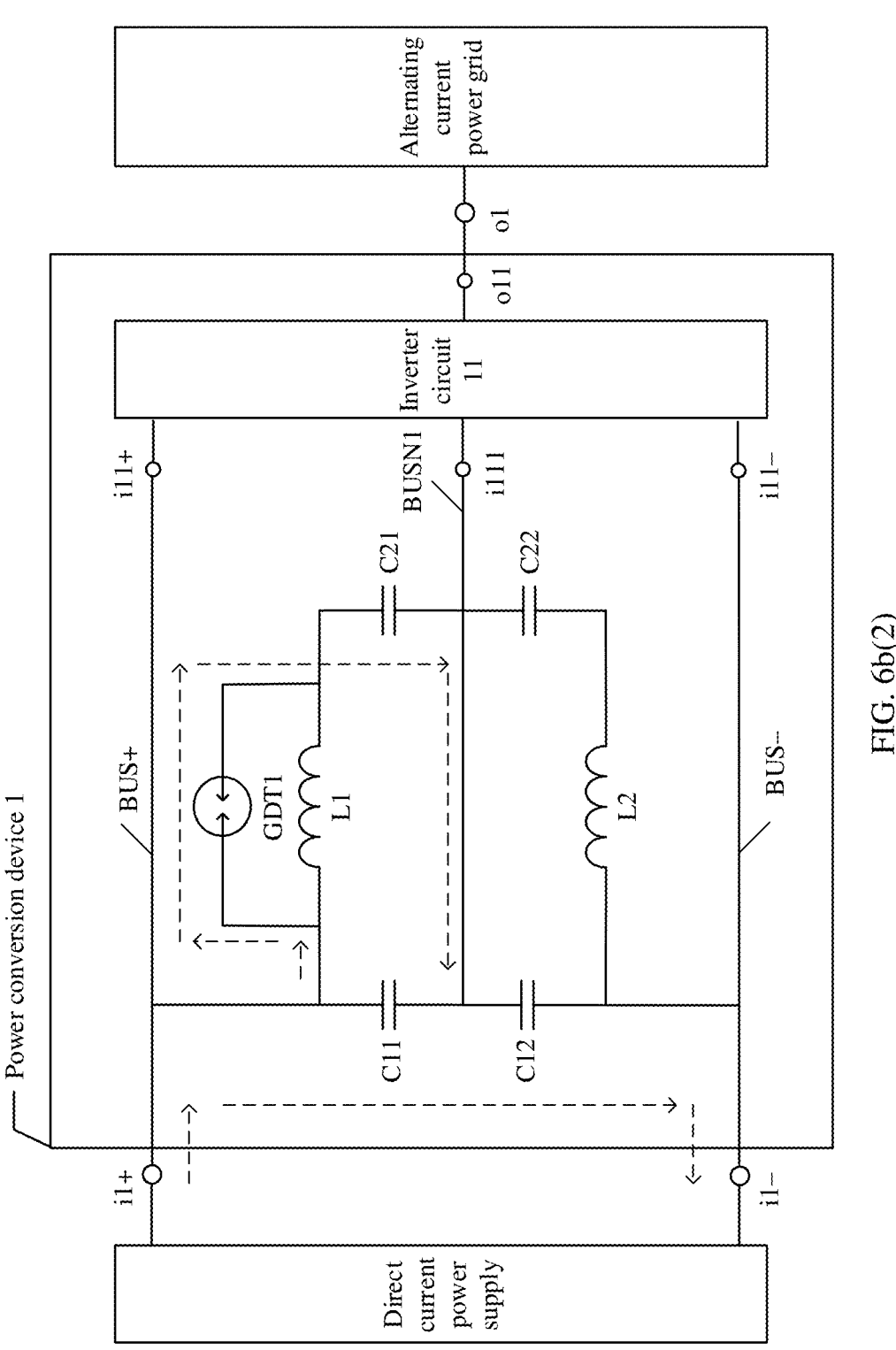
FIG. 6b(2)

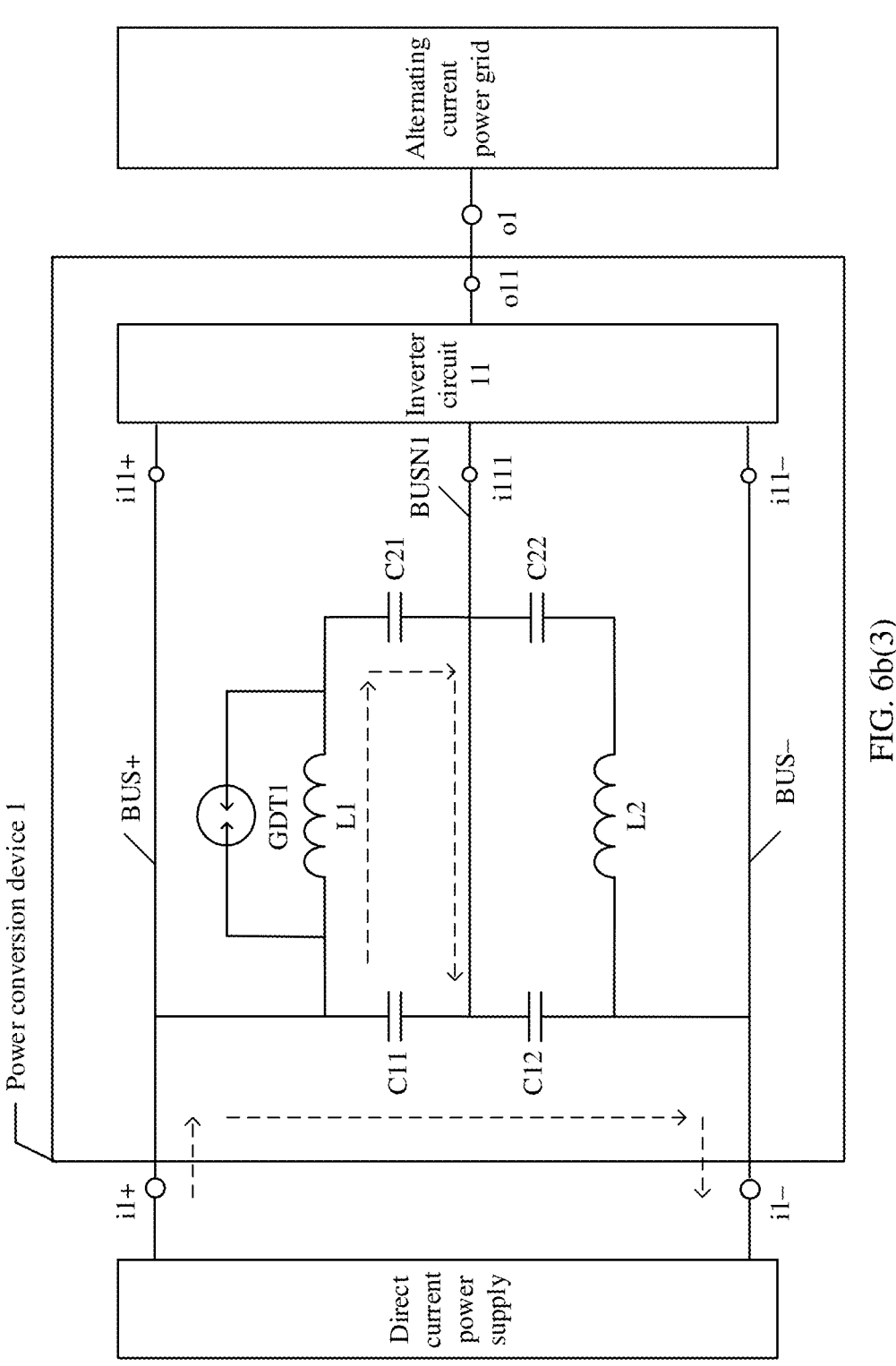
FIG. 6b(3)

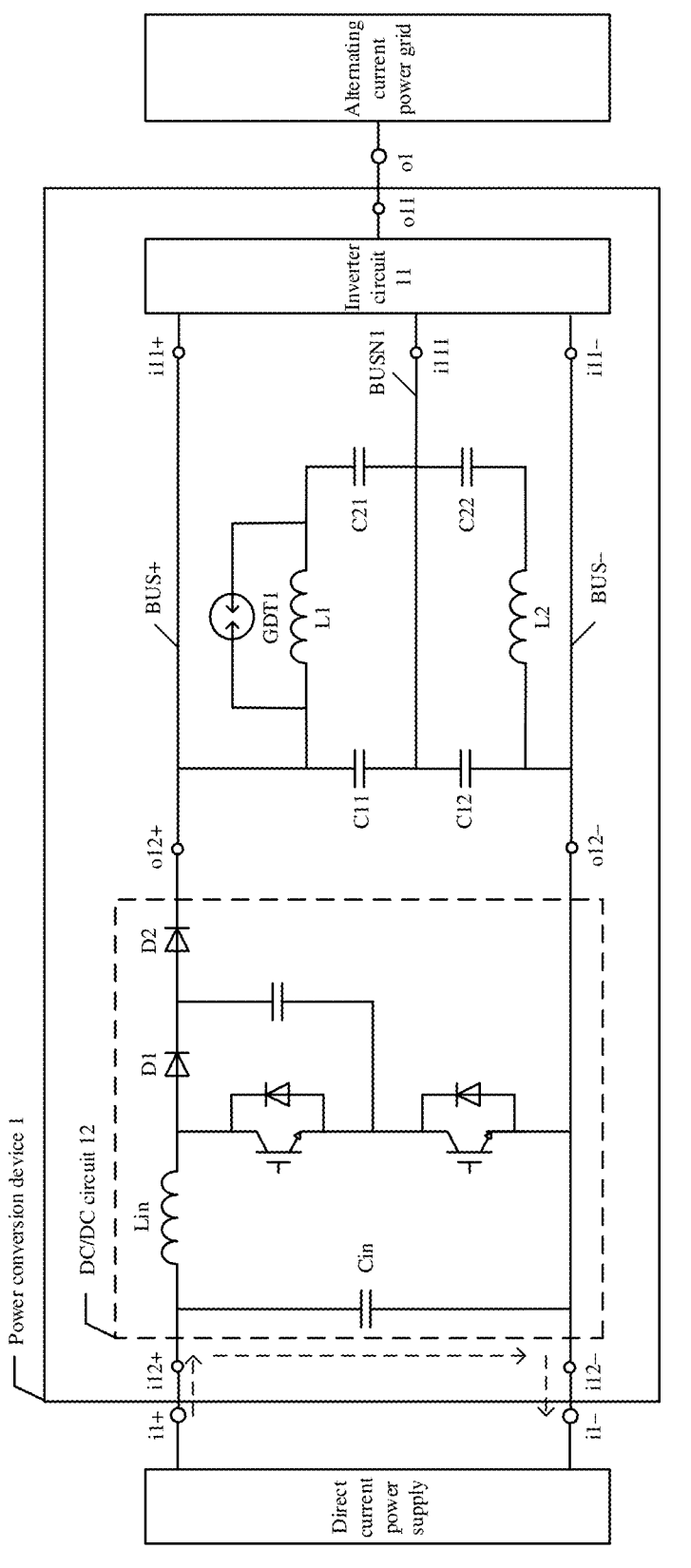
FIG. 6d(1)

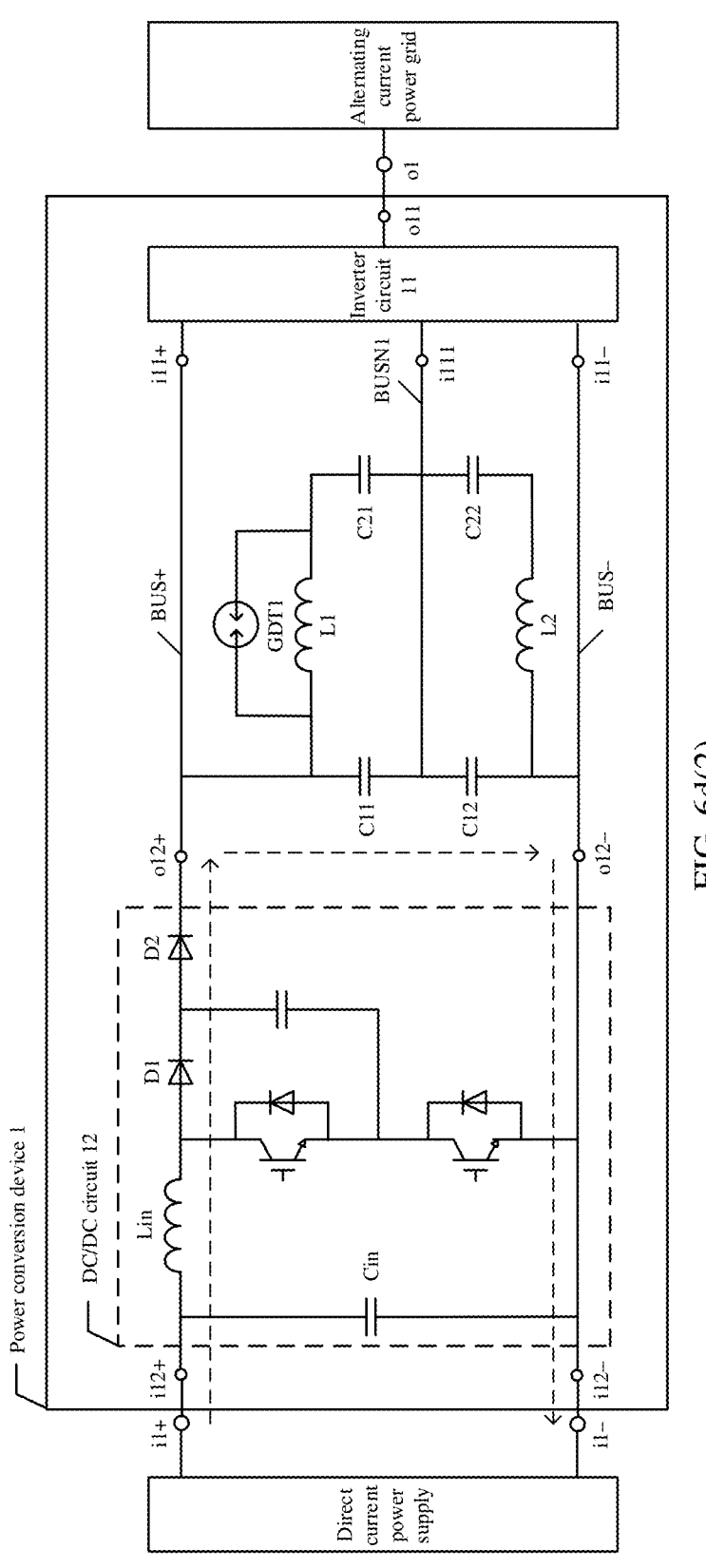
FIG. 6d(2)

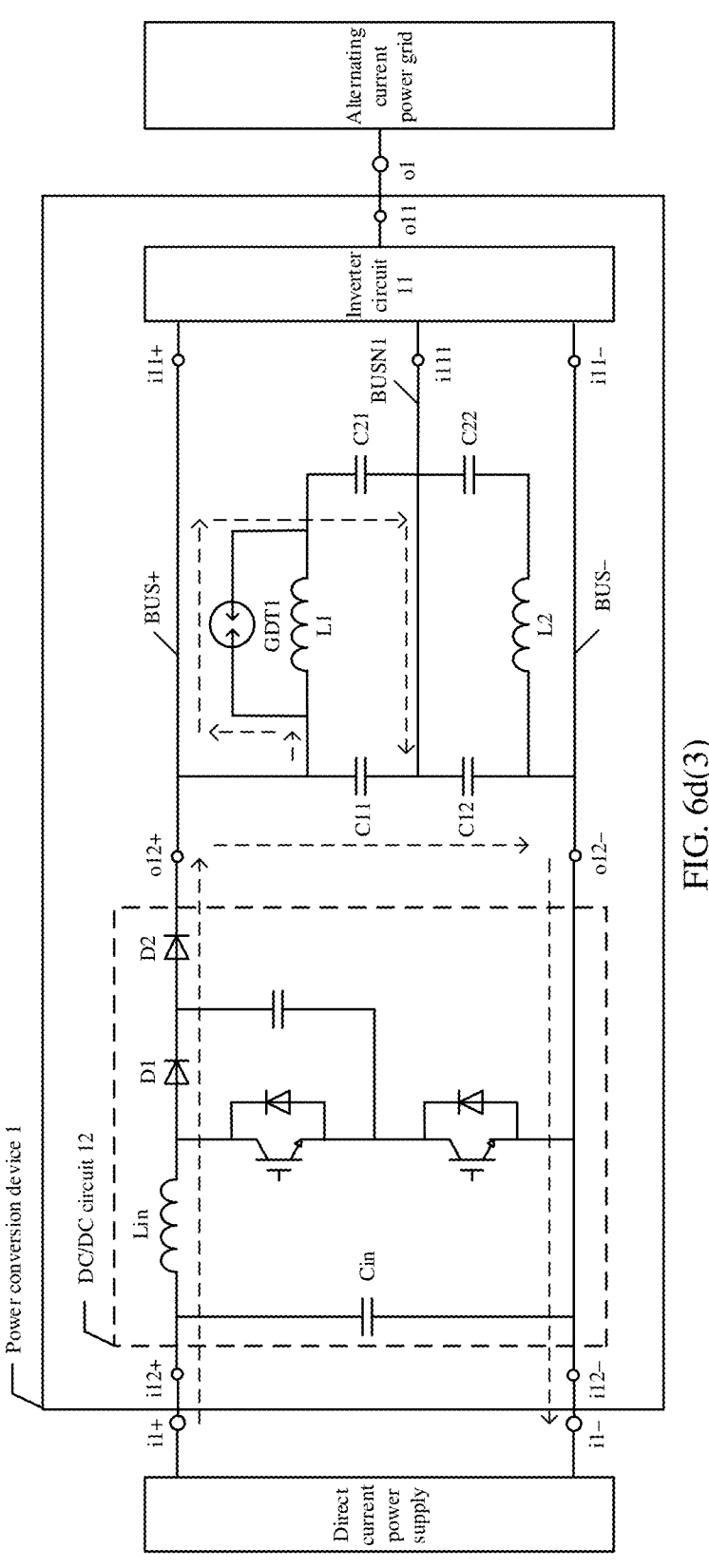
FIG. 6d(3)

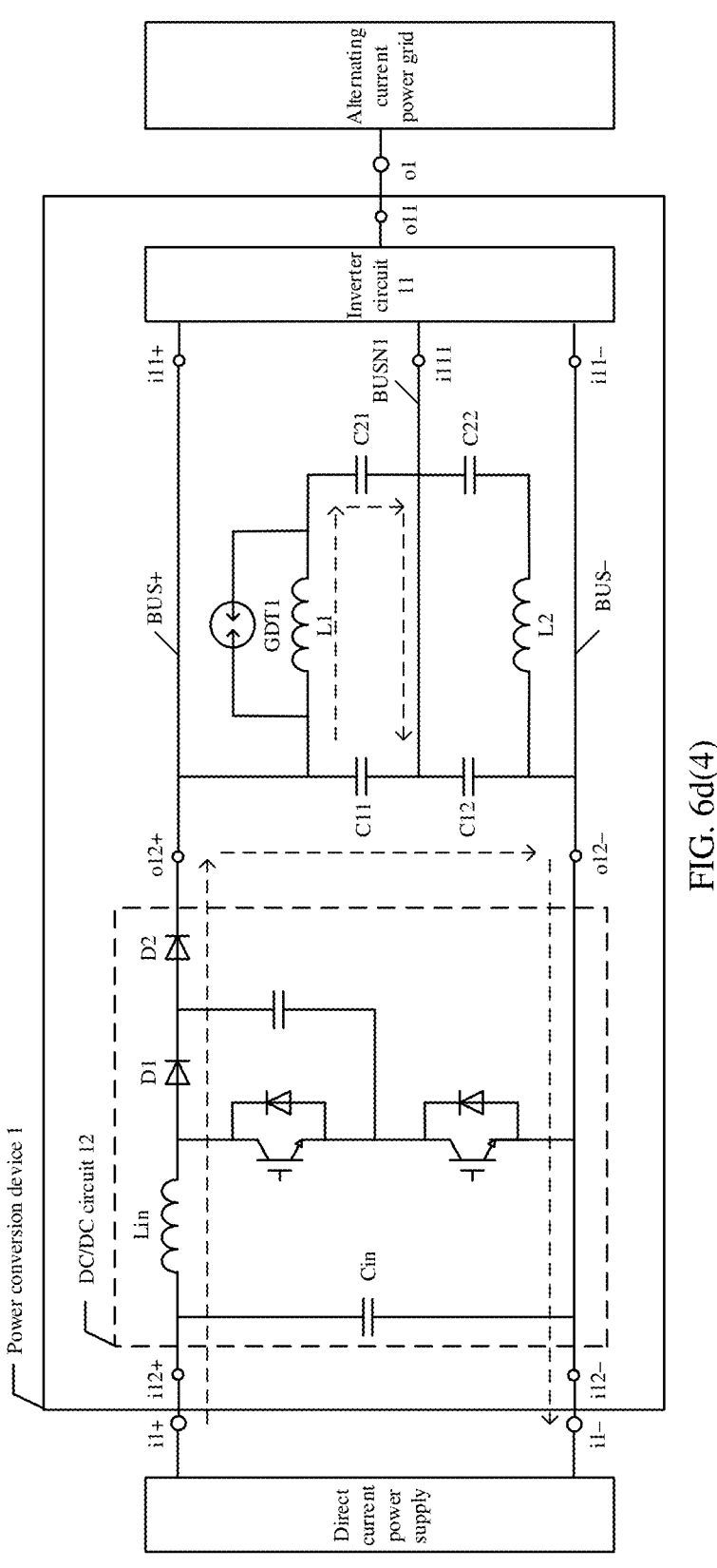
FIG. 6d(4)

POWER CONVERSION DEVICE

CROSS-REFERENCE TO RELATED APPLICATIONS

This application claims priority to Chinese Patent Application No. 202310234294.3, filed on Mar. 2, 2023, the disclosure of which is hereby incorporated by reference in its entirety.

TECHNICAL FIELD

The embodiments relate to the field of power supply technologies, and to a power conversion device.

BACKGROUND

A lightning strike is a discharge phenomenon that occurs when charged clouds are close to each other or when charged clouds are close to the ground. This discharge process produces strong lightning and loud noise, accompanied by a large amount of energy transfer. Outdoor devices such as photovoltaic inverters are equipped with lightning protection apparatuses to ensure operation security. Based on a path of a device through which a lightning strike current flows, lightning strikes are classified into a common mode lightning strike and a differential mode lightning strike. The common mode lightning strike means that the current flows between an input/output port and the ground (PE). The differential mode lightning strike means that the current flows between input ports or between output ports (between cables of three-phase power supply lines) of a device.

Currently, a photovoltaic inverter mainly uses a lightning protection apparatus shown in FIG. 1. As shown in FIG. 1, the photovoltaic inverter includes a direct current/direct current (DC/DC) converter, a bus capacitor, and a DC/AC converter. The DC/DC converter is a three-level flying capacitor topology. The DC/AC converter is a midpoint clamp three-level topology. The bus capacitor includes thin film capacitors C11 and C12 and electrolytic capacitors C21 and C22. The thin film capacitor is mainly used to absorb high-frequency ripples generated when the photovoltaic inverter works. The electrolytic capacitor is mainly used to absorb power frequency ripples. A decoupling inductor (like L1 or L2) is connected between the thin film capacitor and the electrolytic capacitor, to prevent the high-frequency ripples from flowing into the electrolytic capacitor. In addition, the photovoltaic inverter further includes the lightning protection apparatus including an input surge protective device and an output surge protective device. The input surge protective device uses a Y-shaped structure. PV+ and PV− are separately connected to a common point a through varistors RV1 and RV2, and the common point a is connected to the PE through a varistor RV3. One end of a varistor RV4, one end of a varistor RV5, and one end of a varistor RV6 in the output surge protective device are respectively connected to three-phase output terminals of the DC/AC converter, the other end of the varistor RV4, the other end of the varistor RV5, and the other end of the varistor RV6 all are connected to a common point b, and the common point b is connected to the PE through a varistor RV7.

The foregoing lightning protection apparatus can well protect against the common mode lightning strike, and can also prevent the failure of a single surge protective device from causing the failure of the entire lightning protection apparatus to work normally. However, the foregoing lightning protection apparatus cannot protect against the differential mode lightning strike. Specifically, when the differential mode lightning strike occurs on a direct current side of the photovoltaic inverter, a lightning strike current enters from PV+. At first, due to existence of the inductor in the DC/DC converter, most of the differential mode lightning strike current enters an input capacitor Cin, and a voltage of the input capacitor Cin increases. Generally, lightning strike energy cannot make the voltage of the input capacitor Cin reach a working voltage of the input surge protective device. Therefore, the input surge protective device does not work in this phase. Then, energy on the input capacitor Cin is released to the bus capacitor through the inductor in the DC/DC converter. Because the electrolytic capacitor is connected in series to the decoupling inductor, and a capacitance value of the thin film capacitor is less than a capacitance value of the electrolytic capacitor, most of the current flows into the thin film capacitors C11 and C12 at first, and a bus voltage increases rapidly. Consequently, a semiconductor device in the photovoltaic inverter has a risk of being damaged due to voltage overstress.

SUMMARY

The embodiments provide a power conversion device to resolve a case in which a semiconductor device in the power conversion device has a risk of voltage overstress caused by a differential mode lightning strike current.

According to a first aspect, the embodiments provide a power conversion device. An input terminal and an output terminal of the power conversion device are respectively configured to connect to a direct current power supply and an alternating current power grid. The power conversion device includes a positive direct current bus, a negative direct current bus, a first capacitor, a second capacitor, a first inductor, a first discharge unit, and an inverter circuit. An input terminal of the inverter circuit is connected to the input terminal of the power conversion device separately by using the positive direct current bus and the negative direct current bus, and an output terminal of the inverter circuit is connected to the output terminal of the power conversion device. The first capacitor is connected between the positive direct current bus and the negative direct current bus. The second capacitor is connected in series to the first inductor and then connected in parallel to the first capacitor, where a capacitance value of the second capacitor is greater than a capacitance value of the first capacitor. The first discharge unit is connected in parallel to the first inductor, and is configured to be in a conducted state when a voltage of the first inductor is greater than a first action voltage threshold. In this way, in a process in which a bus voltage between the positive direct current bus and the negative direct current bus increases due to a differential mode lightning strike current, lightning strike charges in the first capacitor may be released to the second capacitor by using the first discharge unit. The capacitance value of the second capacitor is greater than the capacitance value of the first capacitor, and a voltage change amount generated when a same amount of charges flows into the second capacitor with the larger capacitance value is smaller. Therefore, a case in which the bus voltage increases rapidly due to the differential mode lightning strike current can be effectively avoided, to resolve a problem that a semiconductor device in the power conversion device has a risk of voltage overstress caused by the rapid increase of the bus voltage.

With reference to the first aspect, in a first possible implementation, the power conversion device further includes a third capacitor, a fourth capacitor, and a second inductor. The first capacitor and the third capacitor are connected in series and then connected between the positive direct current bus and the negative direct current bus. The fourth capacitor is connected in series to the second inductor and then connected in parallel to the third capacitor, where a capacitance value of the fourth capacitor is greater than a capacitance value of the third capacitor. It may be understood that, when the power conversion device includes two inductors, a discharge unit is connected in parallel to two ends of either of the two inductors, so that in the process in which the bus voltage increases due to the differential mode lightning strike current, the lightning strike charges in the first capacitor may be released to the second capacitor. Therefore, the case in which the bus voltage increases rapidly due to the differential mode lightning strike current is effectively avoided, to resolve the problem that the semiconductor device in the power conversion device has the risk of voltage overstress caused by the rapid increase of the bus voltage. In addition, when the power conversion device includes two thin film capacitors and two electrolytic capacitors, the power conversion device may further include the second inductor. Therefore, the power conversion device has various structures and high flexibility.

With reference to the first possible implementation of the first aspect, in a second possible implementation, the power conversion device further includes a second discharge unit, and the second discharge unit is connected in parallel to the second inductor, and is configured to be in a conducted state when a voltage of the second inductor is greater than a second action voltage threshold. It may be understood that, the second discharge unit is connected in parallel to two ends of the second inductor, so that in the process in which the bus voltage increases due to the differential mode lightning strike current, not only the lightning strike charges in the first capacitor may be released to the second capacitor by using the first discharge unit, but also lightning strike charges in the third capacitor may be released to the fourth capacitor by using the second discharge unit. Therefore, the case in which the bus voltage increases rapidly due to the differential mode lightning strike current may be further avoided, to resolve the problem that the semiconductor device in the power conversion device has the risk of voltage overstress caused by the rapid increase of the bus voltage.

With reference to the first aspect, in a third possible implementation, the power conversion device further includes a third capacitor and a fourth capacitor. The first capacitor and the third capacitor are connected in series and then connected between the positive direct current bus and the negative direct current bus. The fourth capacitor is connected in series to the first inductor and then connected in parallel to the third capacitor, where a capacitance value of the fourth capacitor is greater than a capacitance value of the third capacitor. It may be understood that, when the power conversion device includes two thin film capacitors and two electrolytic capacitors, one inductor may be shared by the two electrolytic capacitors, so that in the process in which the bus voltage increases due to the differential mode lightning strike current, by using one discharge unit, the lightning strike charges in the first capacitor may be released to the second capacitor, and lightning strike charges in the third capacitor may be released to the fourth capacitor. Therefore, the case in which the bus voltage increases rapidly due to the differential mode lightning strike current is effectively avoided, to resolve the problem that the semiconductor device in the power conversion device has the risk of voltage overstress caused by the rapid increase of the bus voltage. In addition, the power conversion device is also applicable to a three-level topology.

With reference to any one of the first possible implementation of the first aspect to the third possible implementation of the first aspect, in a fourth possible implementation, the power conversion device further includes a direct current neutral wire. The input terminal of the inverter circuit is connected to the input terminal of the power conversion device separately by using the positive direct current bus, the direct current neutral wire, and the negative direct current bus, and a connection point between the first capacitor and the third capacitor is connected to the direct current neutral wire. It may be understood that, when a quantity of levels of the power conversion device is greater than or equal to 3, the power conversion device further includes a direct current neutral wire. Therefore, the power conversion device is also applicable to a topology structure in which a quantity of levels is greater than or equal to 3.

With reference to any one of the first possible implementation of the first aspect to the third possible implementation of the first aspect, in a fifth possible implementation, the power conversion device further includes a direct current neutral wire, and the input terminal of the power conversion device includes a first input terminal, a second input terminal, and a third input terminal. A first input terminal and a second input terminal of the inverter circuit are connected to the input terminal of the power conversion device separately by using the positive direct current bus and the negative direct current bus, and a connection point between the first capacitor and the third capacitor is connected to a third input terminal of the inverter circuit by using the direct current neutral wire. It may be understood that the direct current neutral wire is connected in various manners, so that the power conversion device has various structures and high flexibility.

With reference to any one of the first aspect to the fifth possible implementation of the first aspect, in a sixth possible implementation, the first discharge unit includes a gas discharge tube, a varistor, or a transient suppression diode. It may be understood that the first discharge unit has various types, so that the power conversion device has various structures and high flexibility.

With reference to the second possible implementation of the first aspect, or the fourth possible implementation of the first aspect to the sixth possible implementation of the first aspect, in a seventh possible implementation, the second discharge unit includes a gas discharge tube, a varistor, or a transient suppression diode. It may be understood that the second discharge unit has various types, so that the power conversion device has various structures and high flexibility.

With reference to any one of the first aspect to the seventh possible implementation of the first aspect, in an eighth possible implementation, the first action voltage threshold is greater than a voltage of the first inductor when the power conversion device is in a first working state, and a working parameter of the power conversion device in the first working state is within a preset working parameter range. Therefore, it can be ensured that the first discharge unit is in a cut-off state when the power conversion device is in a normal working state, so that stability of the power conversion device can be improved.

With reference to any one of the second possible implementation of the first aspect, or the fourth possible implementation of the first aspect to the eighth possible implementation of the first aspect, in a ninth possible implementation, the second action voltage threshold is greater than a voltage of the second inductor when the power conversion device is in the first working state, and the working parameter of the power conversion device in the first working state is within the preset working parameter range. Therefore, it can be ensured that the second discharge unit is in a cut-off state when the power conversion device is in the normal working state, so that stability of the power conversion device can be improved.

With reference to any one of the first aspect to the ninth possible implementation of the first aspect, in a tenth possible implementation, the power conversion device further includes a direct current DC/direct current DC circuit, an input terminal of the DC/DC circuit is connected to the input terminal of the power conversion device, and an output terminal of the DC/DC circuit is connected to the input terminal of the inverter circuit by using the positive direct current bus and the negative direct current bus. In this way, the power conversion device has various functions and structures, and has high flexibility.

BRIEF DESCRIPTION OF DRAWINGS

FIG. 6*b*(1) is a schematic diagram of a path of a differential mode lightning strike current in a power conversion device;

FIG. 6*b*(2) is a schematic diagram of a path of a differential mode lightning strike current in a power conversion device;

FIG. 6*b*(3) is a schematic diagram of a path of a differential mode lightning strike current in a power conversion device;

FIG. 6*d*(1) is a schematic diagram of another path of a differential mode lightning strike current in a power conversion device;

FIG. 6*d*(2) is a schematic diagram of another path of a differential mode lightning strike current in a power conversion device;

FIG. 6*d*(3) is a schematic diagram of another path of a differential mode lightning strike current in a power conversion device;

FIG. 6*d*(4) is a schematic diagram of another path of a differential mode lightning strike current in a power conversion device;

DETAILED DESCRIPTION OF EMBODIMENTS

A power conversion device provided in the embodiments may be applied to a plurality of application fields, such as a new energy smart microgrid field, a power transmission and distribution field, a new energy field (like a photovoltaic grid-connected field and a wind power grid-connected field), a photovoltaic power generation field, an energy storage power generation field, and a wind power generation field. The power conversion device provided in the embodiments may be an inverter (including a string inverter and a distributed inverter), a power conversion system, an uninterruptible power supply (UPS), or the like, and is applicable to different application scenarios such as a photovoltaic power supply scenario (including a large-sized photovoltaic power station scenario, a small/medium-sized distributed photovoltaic power station scenario, a household photovoltaic system scenario, and the like), an energy storage power supply scenario (including a large-sized energy storage power station scenario, a small/medium-sized distributed energy storage power station scenario, a household light storage power generation system scenario, and the like), and an uninterruptible power supply (UPS) power supply scenario. The following uses a photovoltaic power supply scenario as an example for description.

Figure 1:
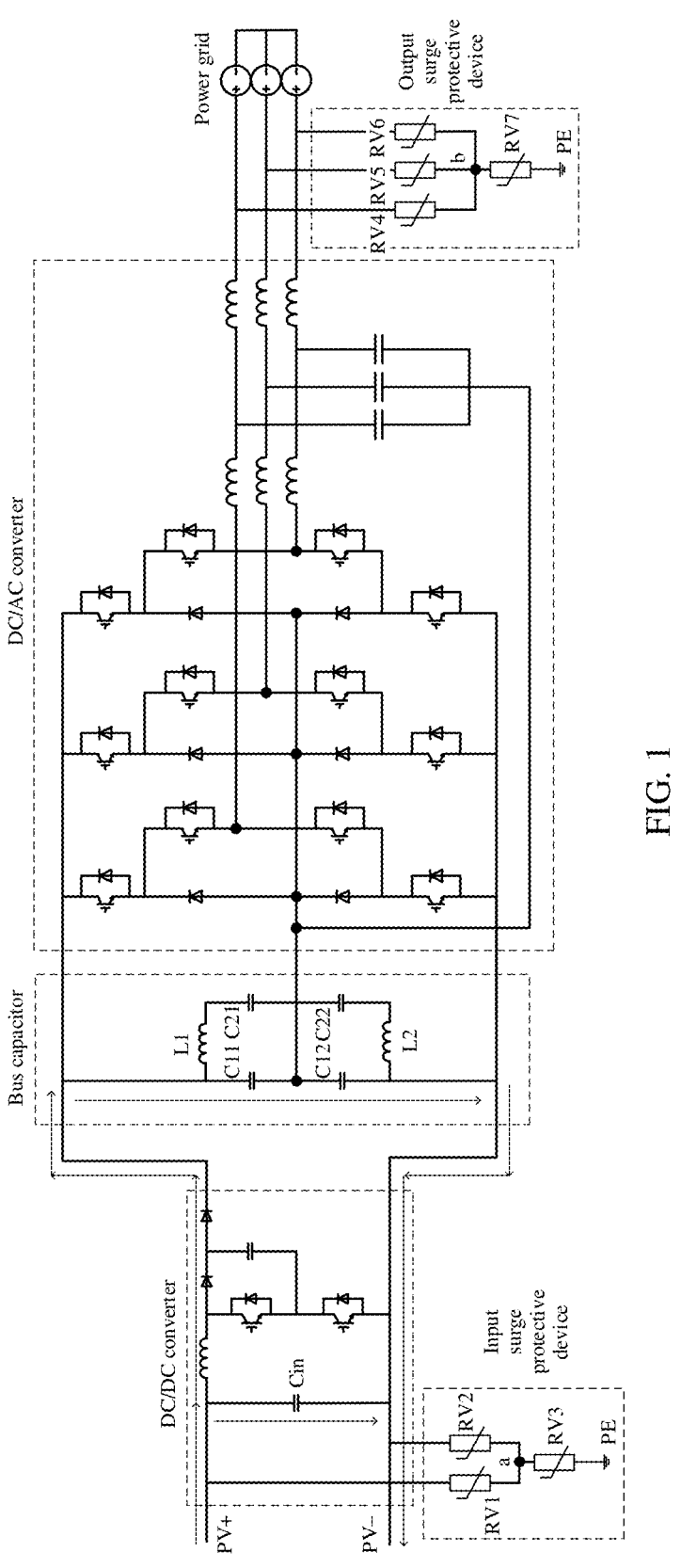
FIG. 1 is a schematic diagram of a structure of a photovoltaic inverter according to the conventional technology.
Figure 2:
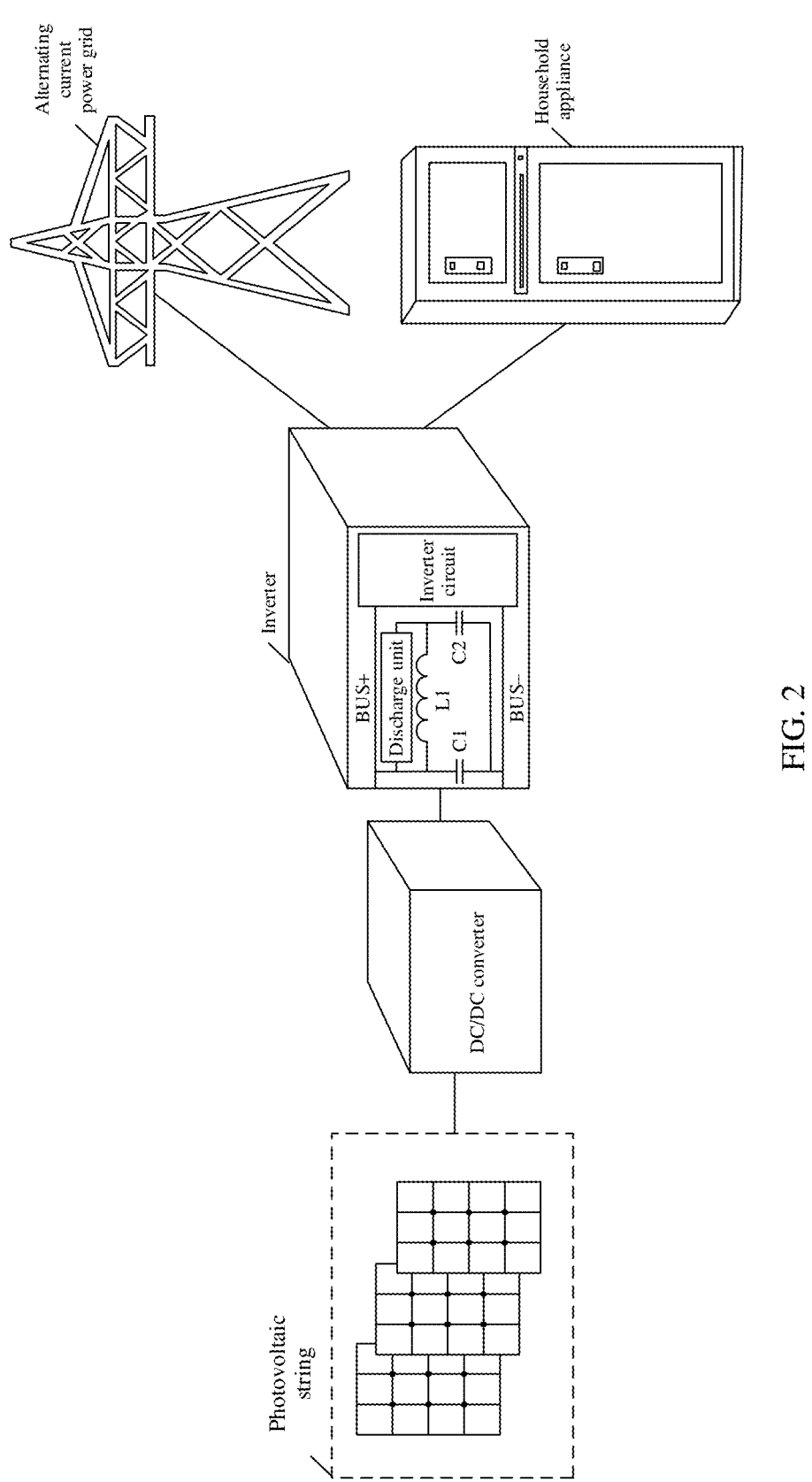
FIG. 2 is a schematic diagram of an application scenario of a power conversion device.

FIG. 2 is a schematic diagram of an application scenario of a power conversion device. In a photovoltaic power supply scenario, the power conversion device provided in this embodiment may be the inverter shown in FIG. 1. An input terminal of the inverter is connected to a photovoltaic string by using a direct current DC/direct current DC converter, and an output terminal is connected to an alternating current power grid or a household appliance. The inverter includes a positive direct current bus BUS+, a negative direct current bus BUS−, a thin film capacitor C1, an electrolytic capacitor C2, an inductor L1, a discharge unit, and an inverter circuit. An input terminal of the inverter circuit is connected to the input terminal of the inverter by using the positive direct current bus BUS+ and the negative direct current bus BUS−, and an output terminal of the inverter circuit is connected to the output terminal of the inverter. The thin film capacitor C1 is connected between the positive direct current bus BUS+ and the negative direct current bus BUS−. The electrolytic capacitor C2 is connected in series to the inductor L1 and then connected in parallel to the thin film capacitor C1. A capacitance value of the electrolytic capacitor C2 is greater than a capacitance value of the thin film capacitor C1. The discharge unit is connected in parallel to the inductor L1. After a photovoltaic power supply system formed by both the DC/DC converter and the inverter starts to run, the DC/DC converter performs direct current conversion on a direct current generated by the photovoltaic string connected to an input terminal of the DC/DC converter, and then outputs a direct current to the inverter. By controlling the inverter circuit, the inverter inverts the direct current converted from the direct current input at the input terminal of the inverter into an alternating current, to supply power to various types of electrical equipment such as the alternating current power grid or an alternating current load (for example, the household appliance). In addition, in a process in which the photovoltaic power supply system supplies power to the alternating current load, when a differential mode lightning strike occurs between input terminals of the inverter, because the inductor L1 exists and the capacitance value of the thin film capacitor C1 is less than the capacitance value of the electrolytic capacitor C2, most of the differential mode lightning strike current flows into the thin film capacitor C1, and a voltage of the inductor L1 (such as a voltage difference between a voltage of the thin film capacitor C1 and a voltage of the electrolytic capacitor C2) starts to increase. When the voltage of the inductor L1 is greater than a first action voltage threshold, the discharge unit is in a conducted state, so that lightning strike charges of the thin film capacitor C1 are released to the electrolytic capacitor C2 before semiconductor devices in the inverter and the DC/DC converter generate voltage overstress. The capacitance value of the thin film capacitor C1 is less than the capacitance value of the electrolytic capacitor C2, and a voltage change amount generated when a same amount of charges flows into the electrolytic capacitor C2 with the larger capacitance value is smaller. Therefore, a case in which a bus voltage (such as a voltage between the positive direct current bus BUS+ and the negative direct current bus BUS−) increases rapidly due to the differential mode lightning strike current can be effectively avoided, to resolve a problem that the semiconductor devices in the inverter and the DC/DC converter have a risk of voltage overstress caused by the rapid increase of the bus voltage. The foregoing is merely an example of the application scenario of the power conversion device provided in the embodiments, and is not exhaustive. The application scenario is not limited in.

The following describes, by using examples with reference to FIG. 3a to FIG. 8d, a working principle of the power conversion device provided in the embodiments.

Figure 3A:
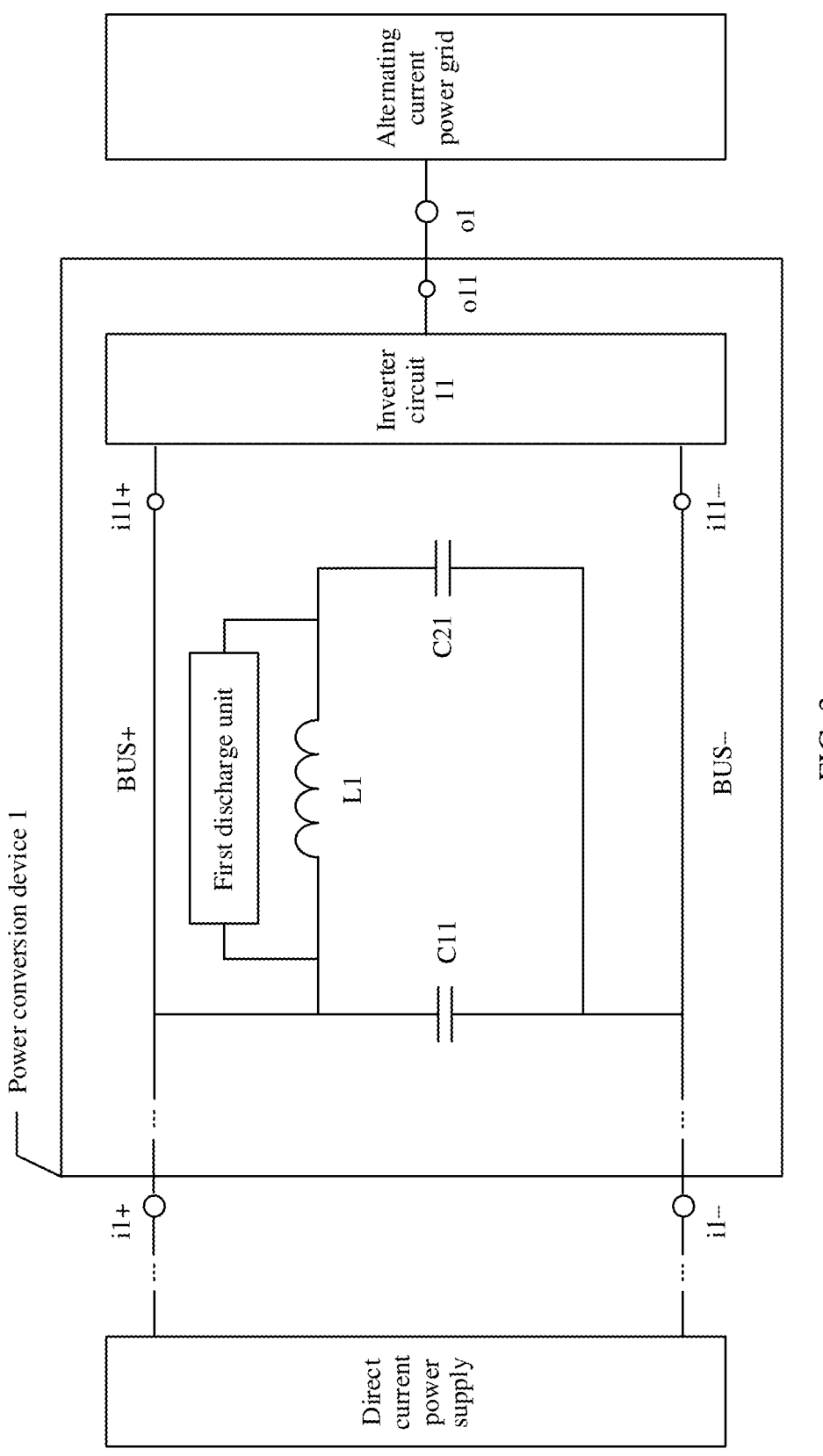
FIG. 3*a* is a schematic diagram of a structure of a power conversion device.

FIG. 3a is a schematic diagram of a structure of a power conversion device according to the embodiments. As shown in FIG. 3a, an input terminal and an output terminal of the power conversion device 1 are respectively configured to connect to a direct current power supply and an alternating current power grid. The power conversion device 1 includes a positive direct current bus BUS+, a negative direct current bus BUS−, a first capacitor C11, a second capacitor C21, a first inductor L1, a first discharge unit, and an inverter circuit 11. Input terminals i11+ and i11− of the inverter circuit 11 are respectively connected to input terminals i1+ and i1− of the power conversion device 1 by using the positive direct current bus BUS+ and the negative direct current bus BUS−, and an output terminal o11 of the inverter circuit 11 is connected to an output terminal o1 of the power conversion device 1. The first capacitor C11 is connected between the positive direct current bus BUS+ and the negative direct current bus BUS−, and the second capacitor C21 is connected in series to the first inductor L1 and then connected in parallel to the first capacitor C11, where a capacitance value of the second capacitor C21 is greater than a capacitance value of the first capacitor C11. The first discharge unit is connected in parallel to the first inductor L1.

In an optional implementation, after the power conversion device 1 starts to work, when a differential mode electrical shock is generated between the input terminals i1+ and i1− of the power conversion device 1, because the capacitance value of the first capacitor C11 is less than the capacitance value of the second capacitor C21, and the first inductor L1 exists, most of a differential mode lightning strike current flows into the first capacitor C11, so that a voltage of the first inductor L1 starts to increase. When the voltage of the first inductor L1 is greater than a first action voltage threshold, the first discharge unit is in a conducted state, so that charges of the first capacitor C11 are released to the second capacitor C21 before a semiconductor device in the power conversion device 1 generates a risk of voltage overstress.

Figure 3B:
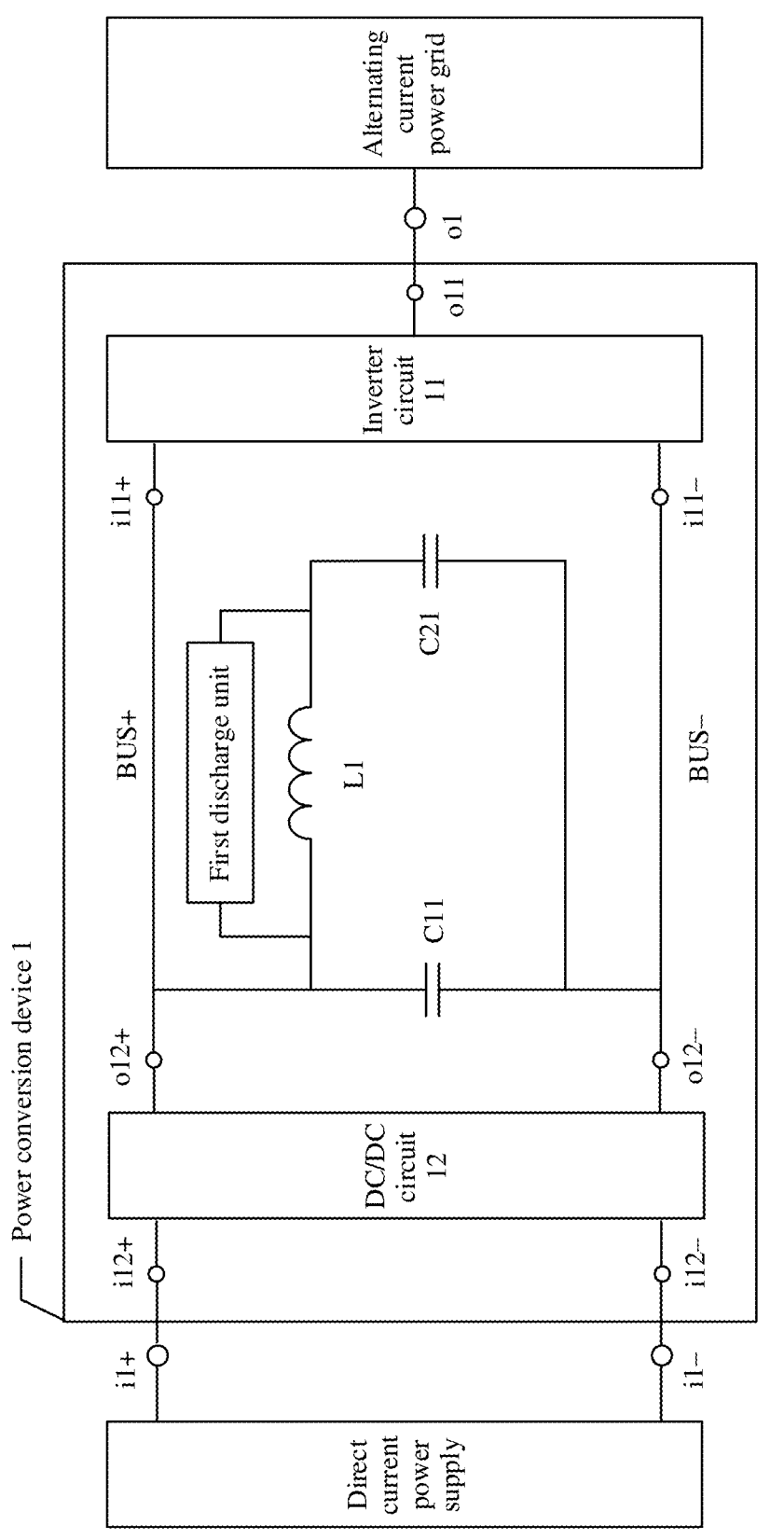
FIG. 3*b* is a schematic diagram of another structure of a power conversion device.

It should be noted that, in the embodiments, A may be directly connected to B, or A may be indirectly connected to B by using C. This is not limited. For example, the input terminals i11+ and i11− of the inverter circuit 11 may be directly connected to the input terminals i1+ and i1− of the power conversion device 1 by using the positive direct current bus BUS+ and the negative direct current bus BUS−respectively. In addition, a DC/DC converter may be further connected between the input terminal of the power conversion device 1 and the direct current power supply, and the DC/DC converter is configured to perform direct current conversion on a direct current output by the direct current power supply. When the power conversion device 1 is a photovoltaic inverter, the direct current power supply may be a photovoltaic string. In this case, in addition to performing direct current conversion on the direct current output by the direct current power supply, the DC/DC converter further implements maximum power point tracking (MPPT) on the photovoltaic string, to ensure efficient power generation of the photovoltaic string. Optionally, the power conversion device 1 further includes a DC/DC circuit 12. For details, refer to a power conversion device 1 shown in FIG. 3b. As shown in FIG. 3b, input terminals of an inverter circuit 11 are respectively connected to output terminals o12+ and o12− of the DC/DC circuit 12 by using a positive direct current bus BUS+ and a negative direct current bus BUS−, and input terminals i12+ and i12− of the DC/DC circuit 12 are connected to input terminals i1+ and i1− of the power conversion device 1. In this case, an input terminal of the power conversion device 1 may be directly connected to a direct current power supply. A function of the DC/DC circuit 12 herein is the same as a function of the foregoing DC/DC converter. Details are not described herein again. The power conversion device 1 has various structures and high flexibility.

In this embodiment, the first discharge unit is connected in parallel to the two ends of the first inductor L1, so that in a process in which the differential mode lightning strike current flows into the first capacitor C11 to make a bus voltage (such as a voltage between the positive direct current bus BUS+ and the negative direct current bus BUS−) increase, lightning strike charges in the first capacitor C11 may be released to the second capacitor C21 by using the first discharge unit. The capacitance value of the first capacitor C11 is less than the capacitance value of the second capacitor C21, and a voltage change amount generated when a same amount of charges flows into the second capacitor C21 with the larger capacitance value is smaller. Therefore, a case in which the bus voltage increases rapidly due to the differential mode lightning strike current can be effectively avoided, to resolve a problem that the semiconductor device in the power conversion device 1 has a risk of voltage overstress caused by the rapid increase of the bus voltage.

Figure 4A:
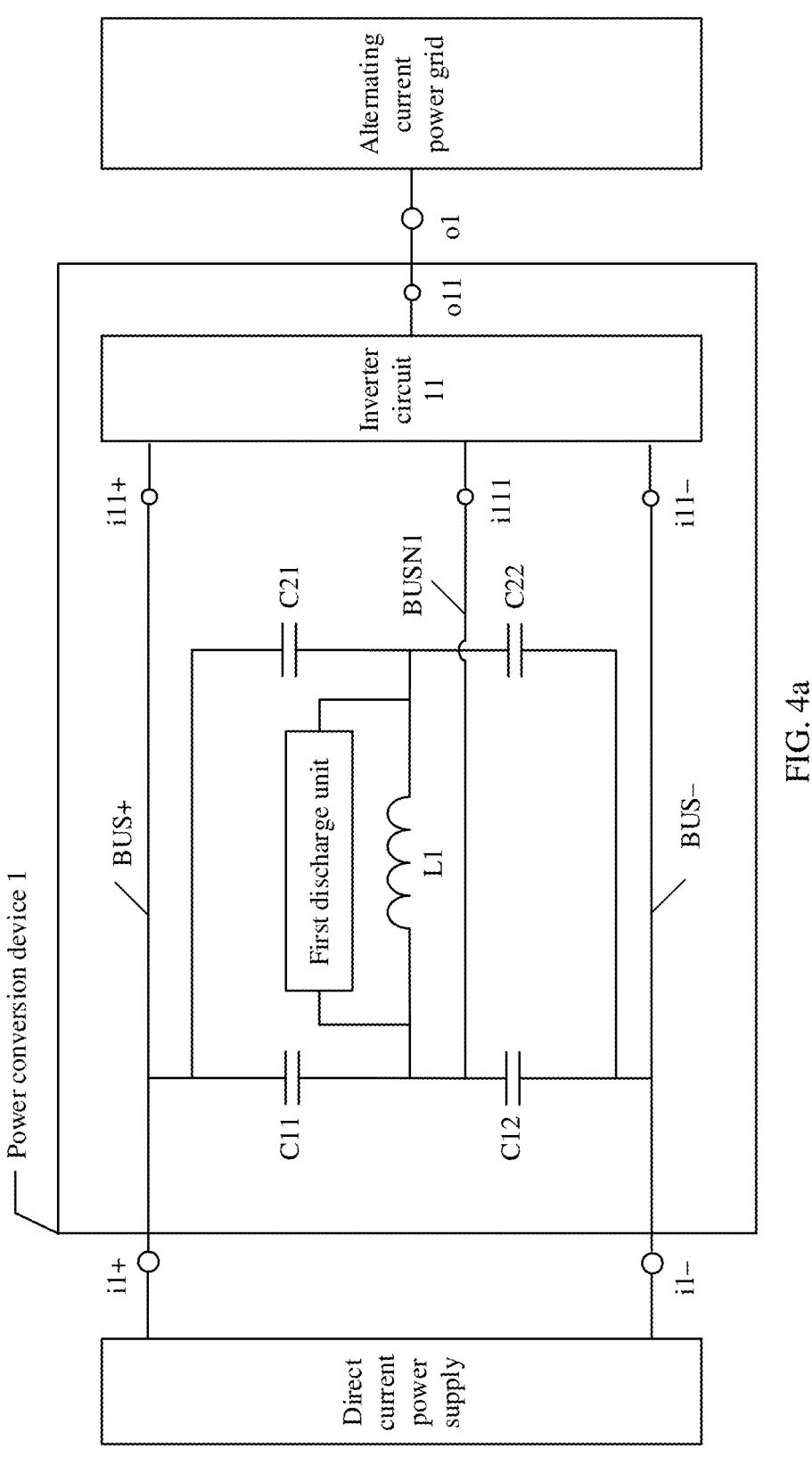
FIG. 4*a* is a schematic diagram of another structure of a power conversion device.

FIG. 4a is a schematic diagram of another structure of a power conversion device according to the embodiments. As shown in FIG. 4a, input terminals i1+ and i1− of a power conversion device 1 are connected to a direct current power supply, and an output terminal o1 is connected to an alternating current power grid. Compared with the power conversion device 1 shown in FIG. 3a, the power conversion device 1 shown in FIG. 4a further includes a third capacitor C12, a fourth capacitor C22, and a direct current neutral wire BUSN1. A first capacitor C11 and the third capacitor C12 are connected in series and then connected between a positive direct current bus BUS+ and a negative direct current bus BUS−. The fourth capacitor C22 is connected in series to a first inductor L1 and then connected in parallel to the third capacitor C12, where a capacitance value of the fourth capacitor C22 is greater than a capacitance value of the third capacitor C12. An inverter circuit 11 is a three-level inverter circuit 11. A first input terminal i11+ and a second input terminal i11− of the inverter circuit 11 are respectively connected to the input terminals i1+ and i1− of the power conversion device 1 by using the positive direct current bus BUS+ and the negative direct current bus BUS−, and a third input terminal il11 of the inverter circuit 11 is connected to a connection point between the first capacitor C11 and the third capacitor C12 by using the direct current neutral wire BUSN1. The third input terminal i111 of the inverter circuit 11 may be understood as a zero potential terminal. Herein, for a connection relationship between a second capacitor C21, the first capacitor C11, and the first inductor L1, refer to descriptions of corresponding parts in the power conversion device 1 shown in FIG. 3a. Details are not described herein again.

Both the first capacitor C11 and the third capacitor C12 may be thin film capacitors, and both the second capacitor C21 and the fourth capacitor C22 may be electrolytic capacitors. A first discharge unit includes a gas discharge tube, a varistor, or a transient suppression diode. For ease of description, the following describes a working principle of the power conversion device 1 by using an example in which the first discharge unit is a gas discharge tube GDT1.

After a differential mode lightning strike is generated between the input terminals i1+ and i1− of the power conversion device 1, because of existence of the first inductor L1, most of a differential mode lightning strike current flows into the first capacitor C11 and the third capacitor C12 at first, and a bus voltage starts to increase. When a voltage of the first inductor L1 (such as a voltage difference between a voltage of the first capacitor C11 and a voltage of the second capacitor C21, or a voltage difference between a voltage of the third capacitor C12 and a voltage of the fourth capacitor C22) is greater than a first action voltage threshold, the gas discharge tube GDT1 is broken down. In this case, the gas discharge tube GDT1 is in a conducted state, lightning strike charges in the first capacitor C11 are released to the second capacitor C21 by using the gas discharge tube GDT1, and lightning strike charges in the third capacitor C12 are released to the fourth capacitor C22 by using the gas discharge tube GDT1. A capacitance value of the first capacitor C11 is less than a capacitance value of the second capacitor C21, the capacitance value of the third capacitor C12 is less than the capacitance value of the fourth capacitor C22, and a voltage change amount generated by a same amount of charges in an electrolytic capacitor with a larger capacitance value is smaller. Therefore, a case in which the bus voltage increases rapidly due to the differential mode lightning strike current can be effectively avoided, to resolve a problem that a semiconductor device in the power conversion device 1 has a risk of voltage overstress caused by the rapid increase of the bus voltage. In addition, the first action voltage threshold of the gas discharge tube GDT1 is greater than the voltage of the first inductor L1 when the power conversion device 1 is in a first working state, where the first working state may be understood as a normal working state (a non-lightning state), and a working parameter (including an input/output voltage, an input/output current, an input/output power, and the like) of the power conversion device 1 in the normal working state is within a preset working parameter range (such as a nominal working parameter range). Therefore, it can be ensured that the gas discharge tube GDT1 is in a cut-off state when the power conversion device 1 is in the normal working state. Then, when the voltage of the first inductor L1 is less than a cut-off voltage threshold, the gas discharge tube GDT1 restores to the cut-off state. In this case, the first inductor L1 is basically saturated, the voltage of the first capacitor C11 and the voltage of the second capacitor C21 increase synchronously, and the voltage of the third capacitor C12 and the voltage of the fourth capacitor C22 increase synchronously.

It should be noted that the first action voltage threshold of the first discharge unit may be adjusted based on an actual requirement. For example, to better avoid the risk of voltage overstress of the semiconductor device caused by the increase of the bus voltage, the first action voltage threshold of the first discharge unit may be set to a smaller value. For example, this may be implemented by selecting a discharging unit with a smaller first action voltage threshold.

In this embodiment, the first discharge unit is connected in parallel to the two ends of the first inductor L1, so that in a process in which the differential mode lightning strike current flows into the first capacitor C11 to make the bus voltage increase, the lightning strike charges in the first capacitor C11 may be released to the second capacitor C21, and the lightning strike charges in the third capacitor C12 may be released to the fourth capacitor C22, by using the first discharge unit. The capacitance value of the first capacitor C11 is less than the capacitance value of the second capacitor C21, the capacitance value of the third capacitor C12 is less than the capacitance value of the fourth capacitor C22, and the voltage change amount generated when the same amount of charges flows into the second capacitor C21 with the larger capacitance value is smaller. Therefore, the case in which the bus voltage increases rapidly due to the differential mode lightning strike current can be effectively avoided, to resolve the problem that the semiconductor device in the power conversion device 1 has the risk of voltage overstress caused by the rapid increase of the bus voltage.

Figure 4B:
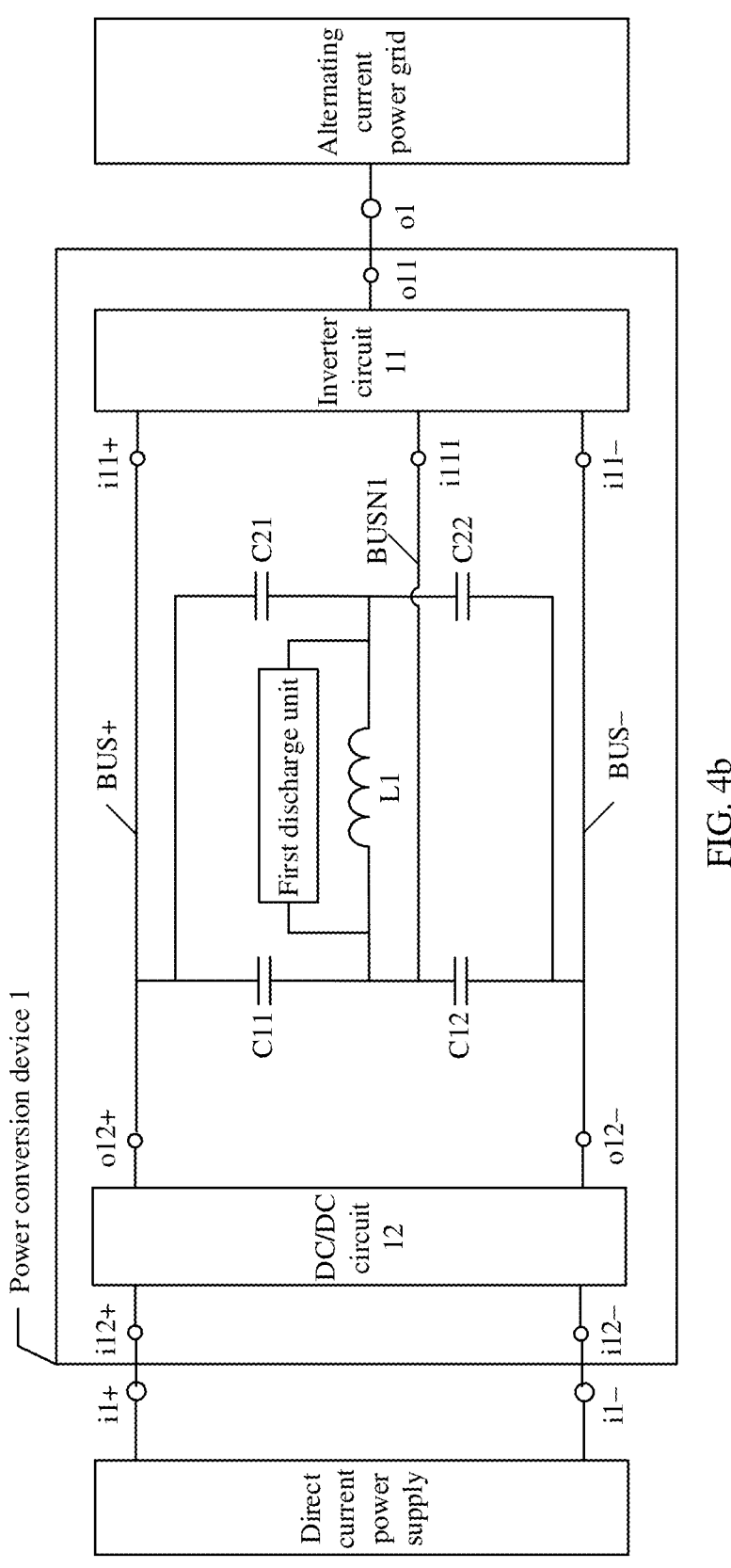
FIG. 4*b* is a schematic diagram of another structure of a power conversion device.

FIG. 4b is a schematic diagram of another structure of a power conversion device according to the embodiments. As shown in FIG. 4b, compared with the power conversion device 1 shown in FIG. 4a, a power conversion device 1 shown in FIG. 4b further includes a DC/DC circuit 12. A first input terminal il1+ and a second input terminal i11− of an inverter circuit 11 are respectively connected to input terminals i1+ and i1− of the power conversion device 1 by firstly using a positive direct current bus BUS+ and a negative direct current bus BUS− and secondly using the DC/DC circuit 12.

Herein, for a working principle of the power conversion device 1 shown in FIG. 4b, refer to descriptions of corresponding parts in the power conversion device 1 shown in FIG. 4a. Details are not described herein again.

In this embodiment, a first discharge unit is connected in parallel to two ends of a first inductor L1, so that in a process in which a differential mode lightning strike current flows into a first capacitor C11 to make a bus voltage increase, lightning strike charges in the first capacitor C11 may be released to a second capacitor C21, and lightning strike charges in a third capacitor C12 may be released to a fourth capacitor C22, by using the first discharge unit. A capacitance value of the first capacitor C11 is less than a capacitance value of the second capacitor C21, a capacitance value of the third capacitor C12 is less than a capacitance value of the fourth capacitor C22, and a voltage change amount generated when a same amount of charges flows into an electrolytic capacitor with a larger capacitance value is smaller. Therefore, a case in which a bus voltage increases rapidly due to the differential mode lightning strike current can be effectively avoided, to resolve a problem that a semiconductor device in the power conversion device 1 has a risk of voltage overstress caused by the rapid increase of the bus voltage.

Figure 5A:
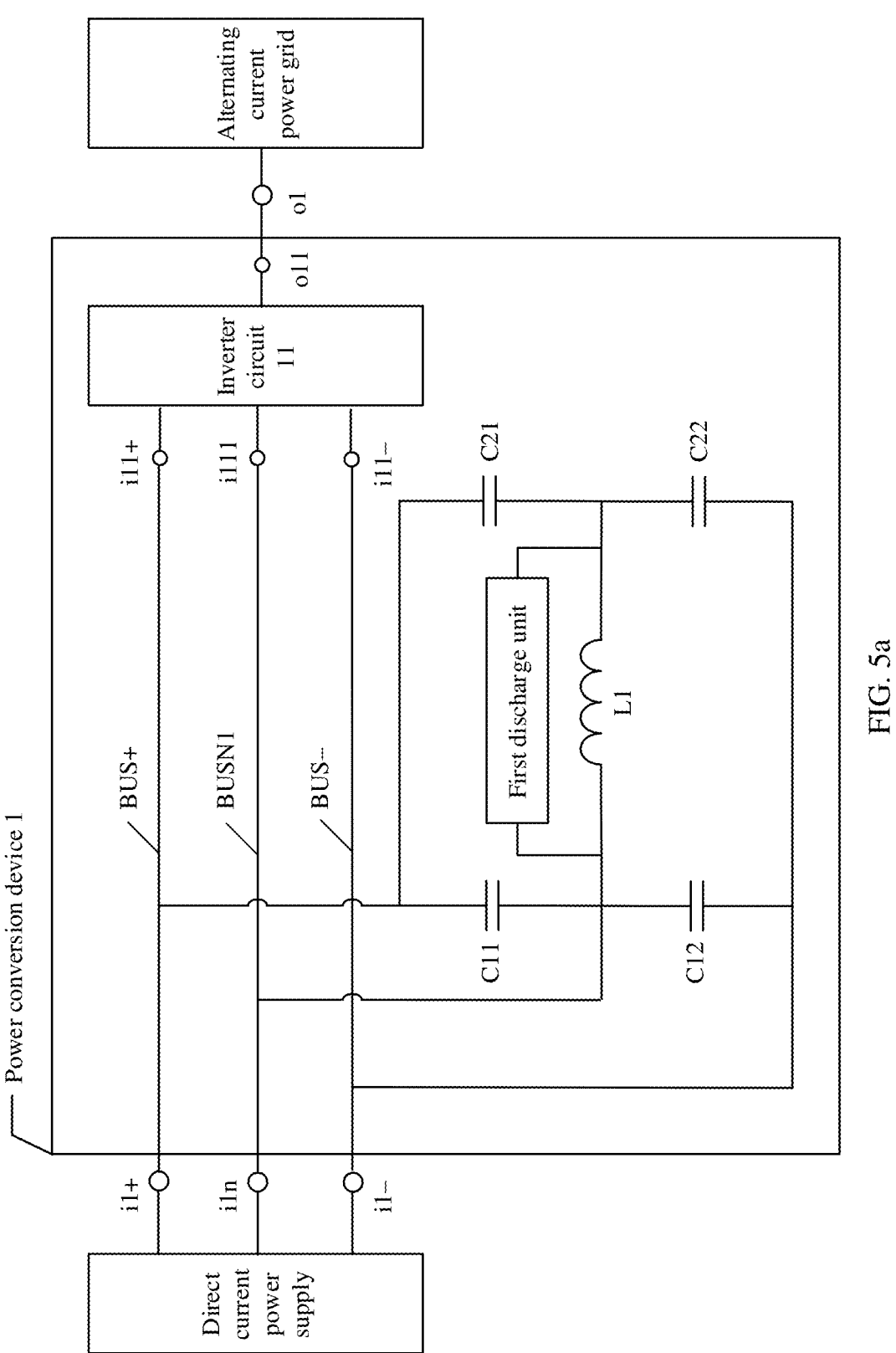
FIG. 5*a* is a schematic diagram of another structure of a power conversion device.

FIG. 5a is a schematic diagram of another structure of a power conversion device according to the embodiments. As shown in FIG. 5a, compared with that in the power conversion device 1 shown in FIG. 4a, a direct current neutral wire BUSN1 in a power conversion device 1 shown in FIG. 5a is connected in a different manner. For example, a first input terminal i11+, a second input terminal i11−, and a third input terminal i111 of an inverter circuit 11 are respectively connected to input terminals i1+, i1−, and i1n of the power conversion device 1 by using a positive direct current bus BUS+, a negative direct current bus BUS−, and the direct current neutral wire BUSN1, and a serial connection point between the first capacitor C11 and the third capacitor C12 is connected to the direct current neutral wire BUSN1. Herein, for a connection relationship between circuit elements other than the direct current neutral wire BUSN1 in the power conversion device 1, refer to descriptions of corresponding parts in the power conversion device 1 shown in FIG. 4a. Details are not described herein again.

Herein, for a working principle of the power conversion device 1, refer to descriptions of corresponding parts in the power conversion device 1 shown in FIG. 4a. Details are not described herein again.

In this embodiment, a first discharge unit is connected in parallel to two ends of a first inductor L1, so that in a process in which a differential mode lightning strike current flows into the first capacitor C11 to make a bus voltage increase, lightning strike charges in the first capacitor C11 may be released to a second capacitor C21, and lightning strike charges in the third capacitor C12 may be released to a fourth capacitor C22, by using the first discharge unit. A capacitance value of the first capacitor C11 is less than a capacitance value of the second capacitor C21, a capacitance value of the third capacitor C12 is less than a capacitance value of the fourth capacitor C22, and a voltage change amount generated when a same amount of charges flows into an electrolytic capacitor with a larger capacitance value is smaller. Therefore, a case in which a bus voltage increases rapidly due to the differential mode lightning strike current can be effectively avoided, to resolve a problem that a semiconductor device in the power conversion device 1 has a risk of voltage overstress caused by the rapid increase of the bus voltage. In addition, the direct current neutral wire BUSN1 in the power conversion device 1 is connected in various manners, so that the power conversion device 1 has various structures and high flexibility.

Figure 5B:
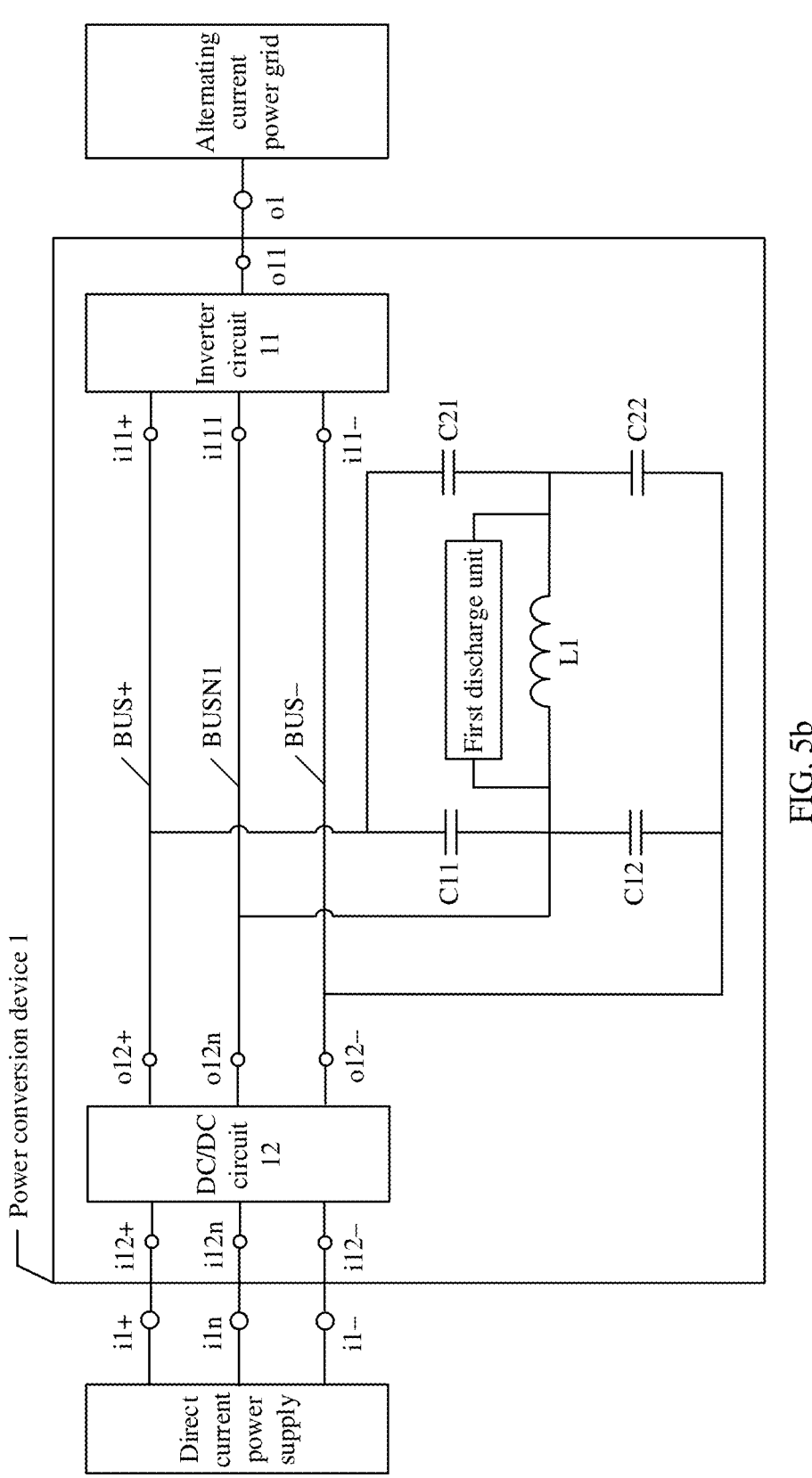
FIG. 5*b* is a schematic diagram of another structure of a power conversion device.

Further, the power conversion device 1 shown in FIG. 5a may further include a DC/DC circuit 12. For details, refer to a power conversion device 1 shown in FIG. 5b. As shown in FIG. 5b, the power conversion device 1 further includes the DC/DC circuit 12. A first input terminal i11+, a second input terminal i11−, and a third input terminal i11n of an inverter circuit 11 are respectively connected to input terminals i1+, i1−, and i1n of the power conversion device 1 by firstly using a positive direct current bus BUS+, a negative direct current bus BUS−, and a direct current neutral wire BUSN1, and secondly using the DC/DC circuit 12.

Herein, for a working principle of the power conversion device 1 shown in FIG. 5b, refer to descriptions of corresponding parts in the power conversion device 1 shown in FIG. 4a. Details are not described herein again.

In this embodiment, a first discharge unit is connected in parallel to two ends of a first inductor L1, so that in a process in which a differential mode lightning strike current flows into a first capacitor C11 to make a bus voltage increase, lightning strike charges in the first capacitor C11 may be released to a second capacitor C21, and lightning strike charges in a third capacitor C12 may be released to a fourth capacitor C22, by using the first discharge unit. A capacitance value of the first capacitor C11 is less than a capacitance value of the second capacitor C21, a capacitance value of the third capacitor C12 is less than a capacitance value of the fourth capacitor C22, and a voltage change amount generated when a same amount of charges flows into an electrolytic capacitor with a larger capacitance value is smaller. Therefore, a case in which a bus voltage increases rapidly due to the differential mode lightning strike current can be effectively avoided, to resolve a problem that a semiconductor device in the power conversion device 1 has a risk of voltage overstress caused by the rapid increase of the bus voltage. In addition, the power conversion device 1 may further include a DC/DC circuit, so that the power conversion device 1 has various functions and structures, and has high flexibility.

Figure 6A:
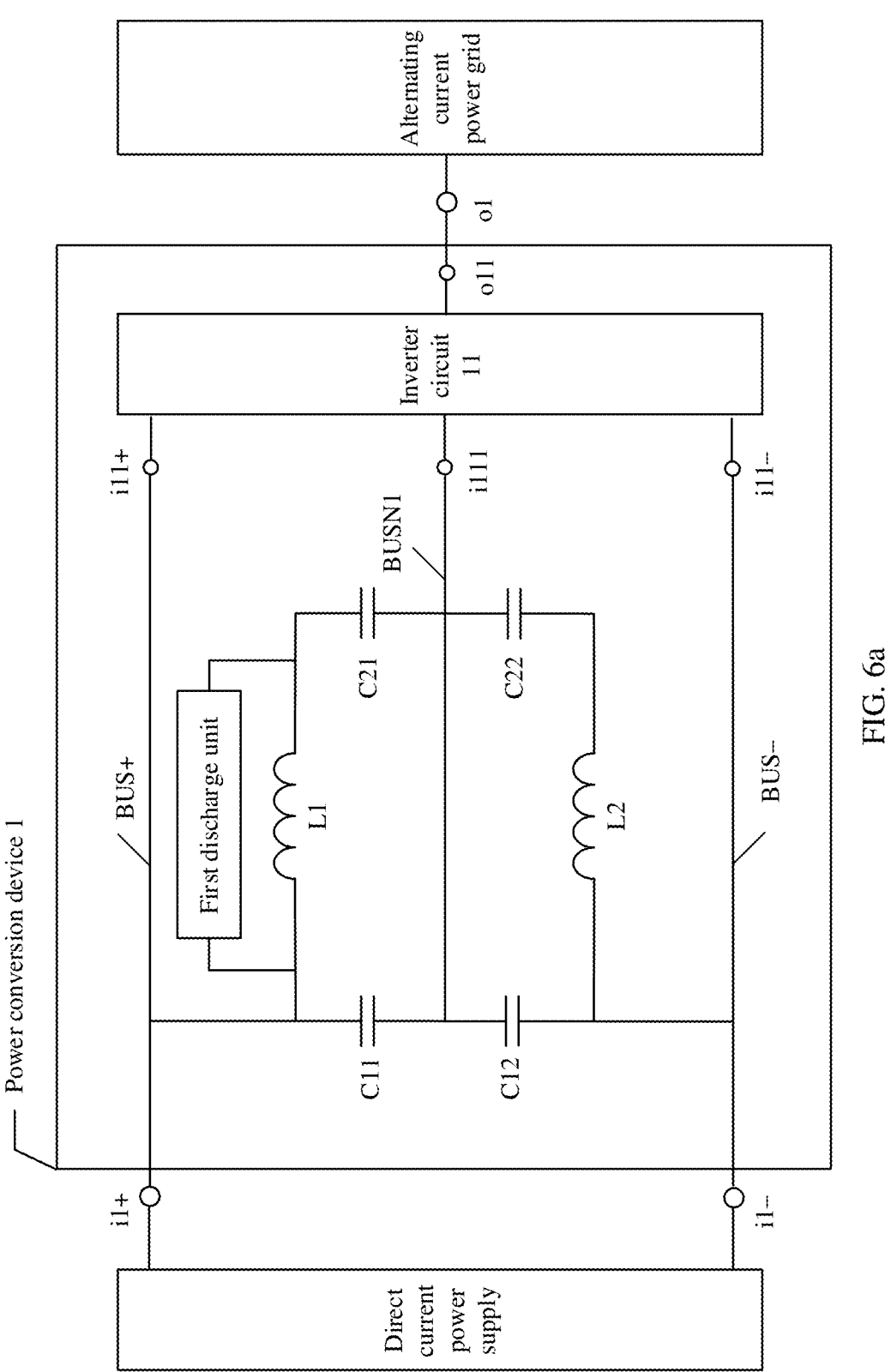
FIG. 6*a* is a schematic diagram of another structure of a power conversion device.

FIG. 6a is a schematic diagram of another structure of a power conversion device according to the embodiments. As shown in FIG. 6a, input terminals i1+ and i1− of a power conversion device 1 are connected to a direct current power supply, and an output terminal o1 is connected to an alternating current power grid. Compared with the power conversion device 1 shown in FIG. 3a, the power conversion device 1 shown in FIG. 6a further includes a third capacitor C12, a fourth capacitor C22, a second inductor L2, and a direct current neutral wire BUSN1. A first capacitor C11 and the third capacitor C12 are connected in series and then connected between a positive direct current bus BUS+ and a negative direct current bus BUS−. The fourth capacitor C22 is connected in series to the second inductor L2 and then connected in parallel to the third capacitor C12, where a capacitance value of the fourth capacitor C22 is greater than a capacitance value of the third capacitor C12. An inverter circuit 11 is a three-level inverter circuit 11. A first input terminal i11+ and a second input terminal i11− of the inverter circuit 11 are respectively connected to input terminals i1+ and i1− of the power conversion device 1 by using the positive direct current bus BUS+ and the negative direct current bus BUS−, and a third input terminal i111 of the inverter circuit 11 is connected to a connection point between the second capacitor C21 and the fourth capacitor C22 by using the direct current neutral wire BUSN1. Herein, for connection relationships between the second capacitor C21, the first capacitor C11, a first inductor L1, and a first discharge unit, refer to descriptions of corresponding parts in the power conversion device 1 shown in FIG. 3a. Details are not described herein again.

It should be noted that the first capacitor may be either C11 or C12. FIG. 6a is a schematic diagram of a structure of the power conversion device 1 by using an example in which the first capacitor is C11. When the first capacitor is C12, the first inductor is L2, the second capacitor is C22, the first discharge unit is connected in parallel to two ends of the first inductor L2, the third capacitor is C11, the second inductor is L1, and the fourth capacitor is C21. For the power conversion device shown in FIG. 6a, when the second inductor L2 in the power conversion device 1 does not exist, in other words, when a first end and a second end of the third capacitor C12 are respectively connected to a first end and a second end of the fourth capacitor C22, a working principle of the power conversion device 1 remains unchanged.

The first discharge unit includes a gas discharge tube, a varistor, or a transient suppression diode. For ease of description, the following describes the working principle of the power conversion device 1 by using an example in which the first discharge unit is a gas discharge tube GDT1 and with reference to a schematic diagram of a path of a differential mode lightning strike current shown in FIG. 6b(1) to FIG. 6b(3).

In an optional implementation, after a differential mode lightning strike is generated between the input terminals i1+ and i1− of the power conversion device 1, as shown in FIG. 6b(1), because of existence of the first inductor L1 and the second inductor L2, most of a differential mode lightning strike current flows into the first capacitor C11 and the third capacitor C12 at first, and a bus voltage starts to increase. When a voltage of the first inductor L1 (such as a voltage difference between a voltage of the first thin film electric capacitor and a voltage of the second capacitor C21) is greater than an action voltage threshold, the first discharge unit is broken down and is in a conducted state, as shown in FIG. 6b(2), and lightning strike charges in the first capacitor C11 are released to the second capacitor C21 by using the first discharge unit. A capacitance value of the first capacitor C11 is less than a capacitance value of the second capacitor C21, and a voltage change amount generated by a same amount of charges in an electrolytic capacitor with a larger capacitance value is smaller. Therefore, a case in which a voltage between the positive direct current bus BUS+ and the direct current neutral wire BUSN1 increases due to the differential mode lightning strike current can be effectively avoided, to effectively avoid a case in which the bus voltage increases rapidly due to the differential mode lightning strike current, and then to resolve a problem that a semiconductor device in the power conversion device 1 has a risk of voltage overstress caused by the rapid increase of the bus voltage. In addition, a first action voltage threshold of the first discharge unit is greater than the voltage of the first inductor L1 when the power conversion device 1 is in a first working state, where the first working state may be understood as a normal working state (a non-lightning state), and a working parameter of the power conversion device 1 in the normal working state is within a preset working parameter range. Therefore, it can be ensured that the first discharge unit is in a cut-off state when the power conversion device 1 is in the normal working state. Then, when the voltage of the first inductor L1 is less than a cut-off voltage threshold, the first discharge unit restores to the cut-off state. In this case, the first inductor L1 is basically saturated. As shown in FIG. 6b(3), the voltage of the first capacitor C11 and the voltage of the second capacitor C21 increase synchronously.

In this embodiment, one discharge unit is connected in parallel to two ends of either of two inductors, so that in a process in which the differential mode lightning strike current flows into the first capacitor C11 and the third capacitor C12 that are connected in series, the bus voltage increases, lightning strike charges in the first capacitor C11 may be released to the second capacitor C21, or lightning strike charges in the third capacitor C12 may be released to the fourth capacitor C22, by using the discharge unit. The capacitance value of the first capacitor C11 is less than the capacitance value of the second capacitor C21, the capacitance value of the third capacitor C12 is less than the capacitance value of the fourth capacitor C22, and the voltage change amount generated when the same amount of charges flows into the electrolytic capacitor with the larger capacitance value is smaller. Therefore, a case in which the bus voltage increases rapidly due to the differential mode lightning strike current can be effectively avoided, to resolve the problem that the semiconductor device in the power conversion device 1 has the risk of voltage overstress caused by the rapid increase of the bus voltage.

Figure 6C:
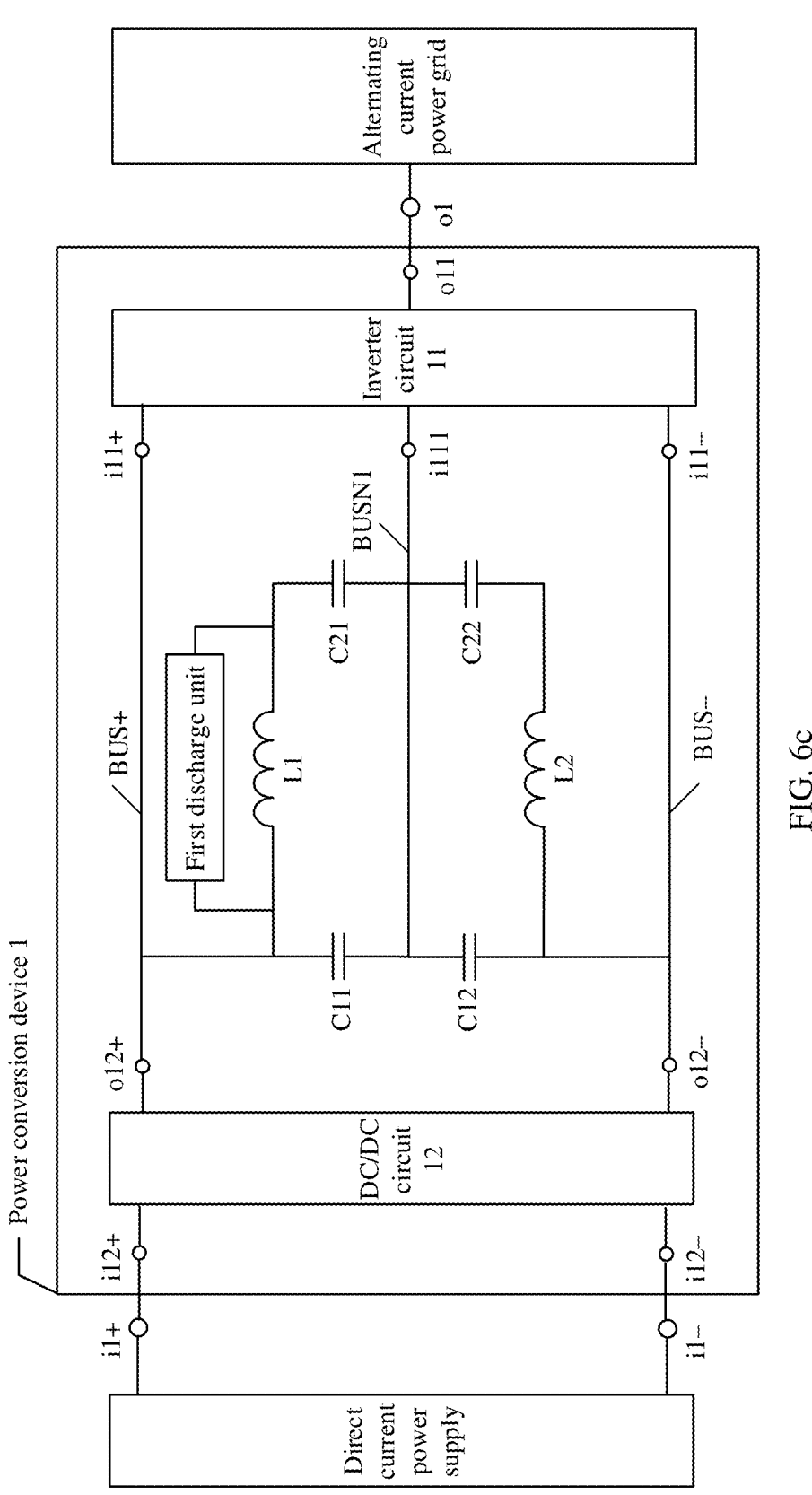
FIG. 6*c* is a schematic diagram of another structure of a power conversion device according.

FIG. 6c is a schematic diagram of another structure of a power conversion device according to the embodiments. As shown in FIG. 6c, compared with the power conversion device 1 shown in FIG. 6a, a power conversion device 1 shown in FIG. 6c may further include a DC/DC circuit 12. A first input terminal i11+ and a second input terminal i11− of an inverter circuit 11 are respectively connected to input terminals i1+ and i1− of the power conversion device 1 by firstly using a positive direct current bus BUS+ and a negative direct current bus BUS−, and secondly using the DC/DC circuit 12.

For ease of description, the following describes a working principle of the power conversion device 1 with reference to a schematic diagram of a path of a differential mode lightning strike current shown in FIG. 6d(1) to FIG. 6d(4) by using an example in which the DC/DC circuit 12 uses a three-level flying capacitor topology and a first discharge unit is a gas discharge tube GDT1.

After a differential mode lightning strike is generated between the input terminals i1+ and i1− of the power conversion device 1, because of existence of an inductor Lin, as shown in FIG. 6d(1), most of the differential mode lightning strike current flows into an input capacitor Cin at first. Then, energy on the input capacitor Cin is gradually released to the positive direct current bus BUS+ and the negative direct current bus BUS-through the inductor Lin, a diode D1, and a diode D2 in sequence. Because a first inductor L1 and a second inductor L2 exist, a capacitance value of a first capacitor C11 is less than a capacitance value of a second capacitor C21, and a capacitance value of a third capacitor C12 is less than a capacitance value of a fourth capacitor C22, as shown in FIG. 6d(2), a current output by the input capacitor Cin flows into the first capacitor C11 and the third capacitor C12, so that a bus voltage starts to increase. When a voltage of the first inductor L1 is greater than a first action voltage threshold, the gas discharge tube GDT1 is broken down. In this case, the gas discharge tube GDT1 is in a conducted state, as shown in FIG. 6d(3), lightning strike charges in the first capacitor C11 are released to the second capacitor C21 by using the gas discharge tube GDT1. The capacitance value of the first capacitor C11 is less than the capacitance value of the second capacitor C21, and a voltage change amount generated by a same amount of charges in an electrolytic capacitor with a larger capacitance value is smaller. Therefore, a case in which the bus voltage increases rapidly due to a differential mode lightning strike current can be effectively avoided, to resolve a problem that a semiconductor device in the power conversion device 1 has a risk of voltage overstress caused by the rapid increase of the bus voltage. In addition, the first action voltage threshold of the gas discharge tube GDT1 is greater than the voltage of the first inductor L1 when the power conversion device 1 is in a first working state, where the first working state may be understood as a normal working state, and a working parameter of the power conversion device 1 in the normal working state is within a preset working parameter range (such as a nominal working parameter range). Therefore, it can be ensured that the gas discharge tube GDT1 is in a cut-off state when the power conversion device 1 is in the normal working state. Then, when the voltage of the first inductor L1 is less than a cut-off voltage threshold, the gas discharge tube GDT1 restores to the cut-off state. In this case, the first inductor L1 is basically saturated. As shown in FIG. 6*d*(4), the voltage of the first capacitor C11 and the voltage of the second capacitor C21 increase synchronously.

In this embodiment, one discharge unit is connected in parallel to two ends of either of two inductors, so that in a process in which the differential mode lightning strike current flows into the first capacitor C11 and the third capacitor C12 that are connected in series, the bus voltage increases, lightning strike charges in the first capacitor C11 may be released to the second capacitor C21, or lightning strike charges in the third capacitor C12 may be released to the fourth capacitor C22, by using the discharge unit. The capacitance value of the first capacitor C11 is less than the capacitance value of the second capacitor C21, the capacitance value of the third capacitor C12 is less than the capacitance value of the fourth capacitor C22, and the voltage change amount generated when the same amount of charges flows into the electrolytic capacitor with the larger capacitance value is smaller. Therefore, a case in which the bus voltage increases rapidly due to the differential mode lightning strike current can be effectively avoided, to resolve the problem that the semiconductor device in the power conversion device 1 has the risk of voltage overstress caused by the rapid increase of the bus voltage. In addition, the power conversion device 1 may further include a DC/DC circuit, so that the power conversion device 1 has various functions and structures, and has high flexibility.

Figure 7A:
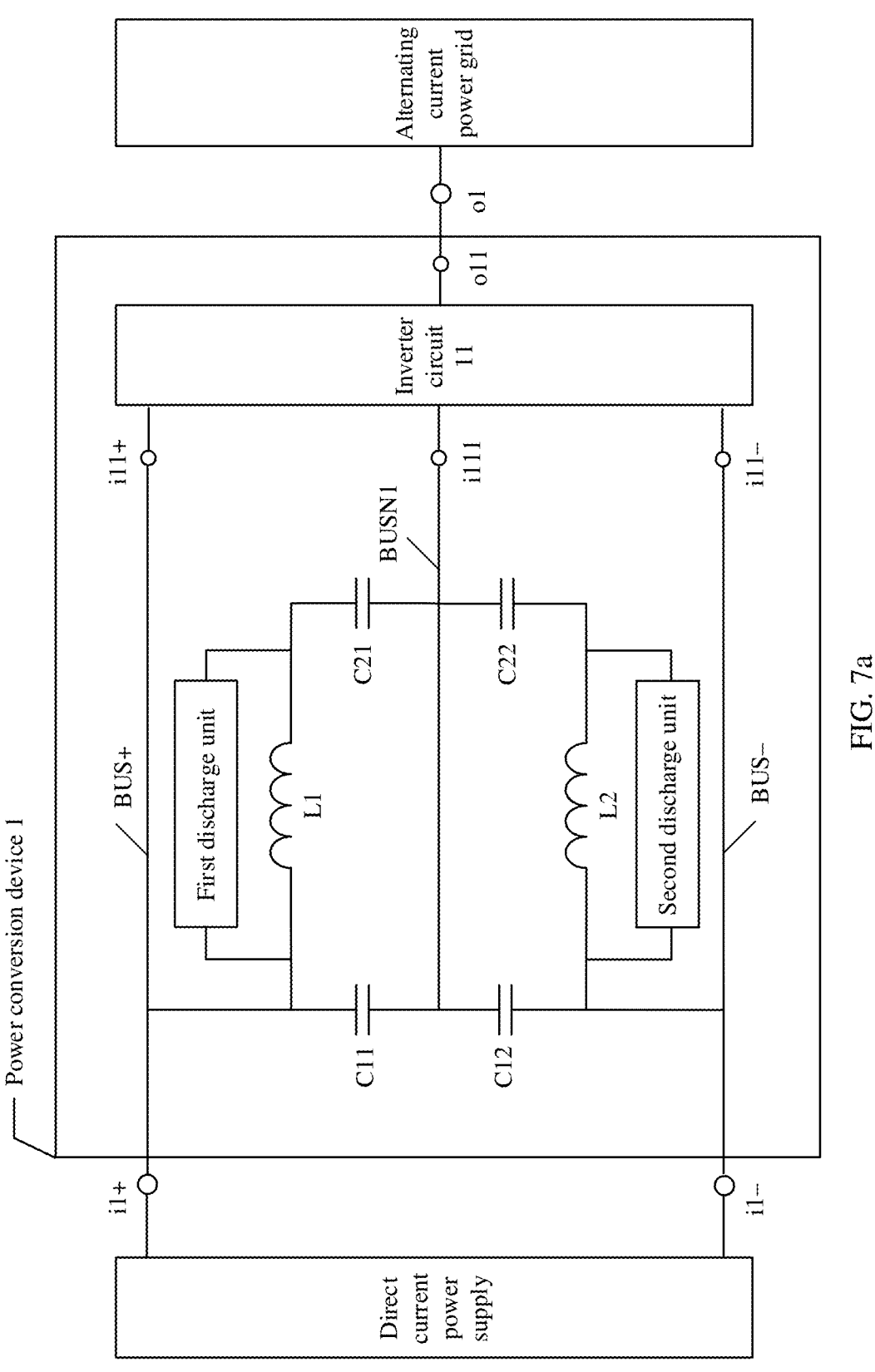
FIG. 7*a* is a schematic diagram of another structure of a power conversion device according.

FIG. 7*a* is a schematic diagram of another structure of a power conversion device according to the embodiments. Compared with the power conversion device 1 shown in FIG. 6*a*, a power conversion device 1 shown in FIG. 7*a* further includes a second discharge unit. The second discharge unit is connected in parallel to a second inductor L2. Herein, for descriptions of circuit elements other than the second discharge unit in the power conversion device 1, refer to descriptions of corresponding parts in the power conversion device 1 shown in FIG. 6*a*. Details are not described herein again.

Both a first discharge unit and the second discharge unit include a gas discharge tube, a varistor, or a transient suppression diode. The first discharging unit and the second discharging unit may be of a same type or different types. This is not limited.

In an optional implementation, after a differential mode lightning strike is generated between input terminals i1+ and i1− of the power conversion device 1, because of existence of a first inductor L1 and the second inductor L2, most of the differential mode lightning strike current flows into a first capacitor C11 and a third capacitor C12 at first, so that a bus voltage starts to increase. When a voltage of the first inductor L1 (such as a voltage difference between a voltage of the first capacitor C11 and a voltage of the second capacitor C21) is greater than a first action voltage threshold, the first discharge unit is broken down, and is in a conducted state, and lightning strike charges in the first capacitor C11 are released to the second capacitor C21 by using the first discharge unit. In addition, when a voltage of the second inductor L2 (such as a voltage difference between a voltage of the third capacitor C12 and a voltage of the fourth capacitor C22) is greater than a second action voltage threshold, the second discharge unit is broken down, and is in the conducted state, and lightning strike charges in the third capacitor C12 are released to the fourth capacitor C22 by using the second discharge unit. A capacitance value of the first capacitor C11 is less than a capacitance value of the second capacitor C21, a capacitance value of the third capacitor C12 is less than a capacitance value of the fourth capacitor C22, and a voltage change amount generated by a same amount of charges in an electrolytic capacitor with a larger capacitance value is smaller. Therefore, a case in which a bus voltage increases rapidly due to a differential mode lightning strike current can be effectively avoided, to resolve a problem that a semiconductor device in the power conversion device 1 has a risk of voltage overstress caused by the rapid increase of the bus voltage. In addition, the first action voltage threshold of the first discharge unit is greater than the voltage of the first inductor L1 when the power conversion device 1 is in a first working state, and the second action voltage threshold of the second discharge unit is greater than the voltage of the second inductor L2 when the power conversion device 1 is in the first working state. The first action voltage threshold of the first discharge unit may be the same as or different from the second action voltage threshold of the second discharge unit. The first working state may be understood as a normal working state (a non-lightning state). In the normal working state, a working parameter of the power conversion device 1 is within a preset working parameter range. Therefore, it can be ensured that both the first discharge unit and the second discharge unit are in a cut-off state when the power conversion device 1 is in the normal working state. Then, when the voltage of the first inductor L1 is less than a cut-off voltage threshold, the first discharge unit restores to the cut-off state. In this case, the first inductor L1 is basically saturated, and the voltage of the first capacitor C11 and the voltage of the second capacitor C21 increase synchronously. In addition, when the voltage of the second inductor L2 is less than the cut-off voltage threshold, the second discharge unit restores to the cut-off state. In this case, the second inductor L2 is basically saturated, and the voltage of the third capacitor C12 and the voltage of the fourth capacitor C22 increase synchronously.

In this embodiment, one discharge unit is connected in parallel to two ends of each inductor, so that in a process in which the differential mode lightning strike current flows into the first capacitor C11 and the third capacitor C12 that are connected in series, the bus voltage increases, lightning strike charges in the first capacitor C11 are released to the second capacitor C21 by using the first discharge unit, and lightning strike charges in the third capacitor C12 are released to the fourth capacitor C22 by using the second discharge unit. The capacitance value of the first capacitor C11 is less than the capacitance value of the second capacitor C21, the capacitance value of the third capacitor C12 is less than the capacitance value of the fourth capacitor C22, and the voltage change amount generated when the same amount of charges flows into the electrolytic capacitor with the larger capacitance value is smaller. Therefore, the case in which the bus voltage increases rapidly due to the differential mode lightning strike current can be effectively avoided, to resolve the problem that the semiconductor device in the power conversion device 1 has the risk of voltage overstress caused by the rapid increase of the bus voltage.

Figure 7B:
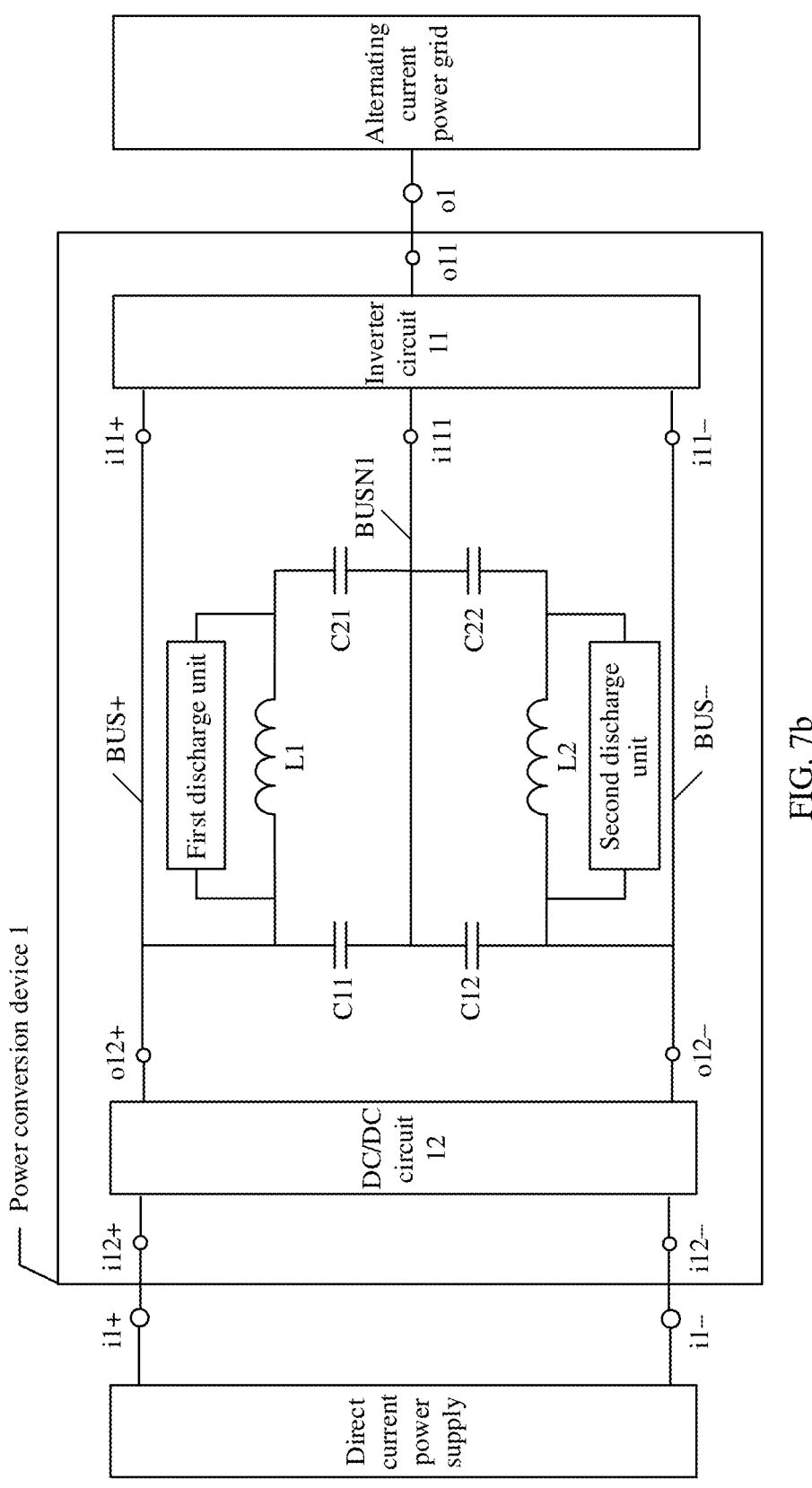
FIG. 7*b* is a schematic diagram of another structure of a power conversion device according.

Further, the power conversion device 1 shown in FIG. 7*a* may further include a DC/DC circuit 12. For details, refer to a power conversion device 1 shown in FIG. 7*b*. As shown in FIG. 7*b*, the power conversion device 1 further includes the DC/DC circuit 12. A first input terminal i11+ and a second input terminal i11− of an inverter circuit 11 are respectively connected to input terminals i1+ and i1− of the power conversion device 1 by firstly using a positive direct current bus BUS+ and a negative direct current bus BUS−, and secondly using the DC/DC circuit 12.

Herein, for a working principle of the power conversion device 1 shown in FIG. 7*b*, refer to descriptions of corresponding parts in the power conversion device 1 shown in FIG. 7*a*. Details are not described herein again.

In this embodiment, one discharge unit is connected in parallel to two ends of each inductor, so that in a process in which a differential mode lightning strike current flows into a first capacitor C11 and a third capacitor C12 that are connected in series, a bus voltage increases, lightning strike charges in the first capacitor C11 are released to a second capacitor C21 by using a first discharge unit, and lightning strike charges in the third capacitor C12 are released to a fourth capacitor C22 by using a second discharge unit. A capacitance value of the first capacitor C11 is less than a capacitance value of the second capacitor C21, a capacitance value of the third capacitor C12 is less than a capacitance value of the fourth capacitor C22, and a voltage change amount generated when a same amount of charges flows into an electrolytic capacitor with a larger capacitance value is smaller. Therefore, a case in which a bus voltage increases rapidly due to the differential mode lightning strike current can be effectively avoided, to resolve a problem that a semiconductor device in the power conversion device 1 has a risk of voltage overstress caused by the rapid increase of the bus voltage. In addition, the power conversion device 1 may further include a DC/DC circuit, so that the power conversion device 1 has various functions and structures, and has high flexibility.

Figure 8A:
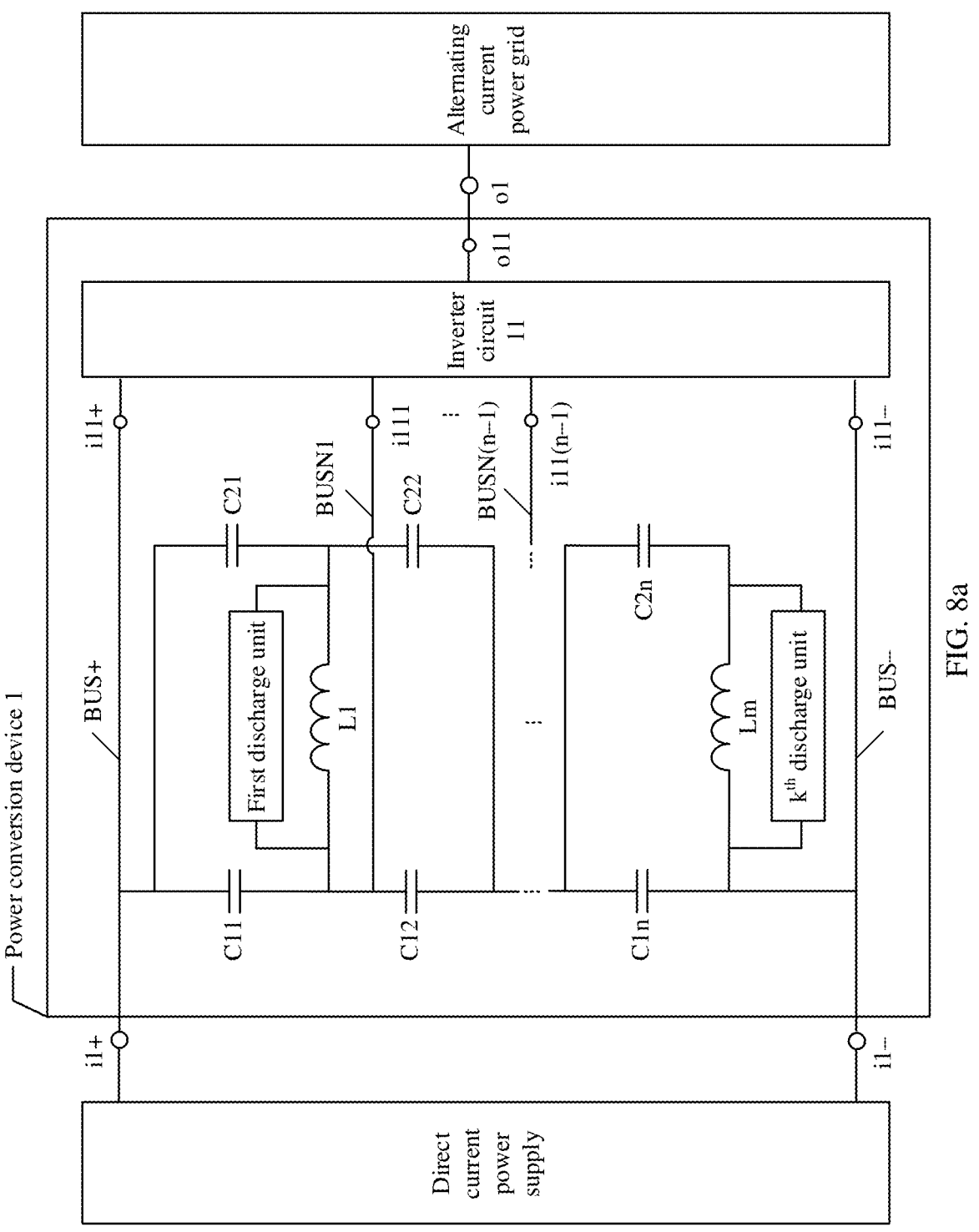
FIG. 8*a* is a schematic diagram of another structure of a power conversion device according.
Figure 8B:
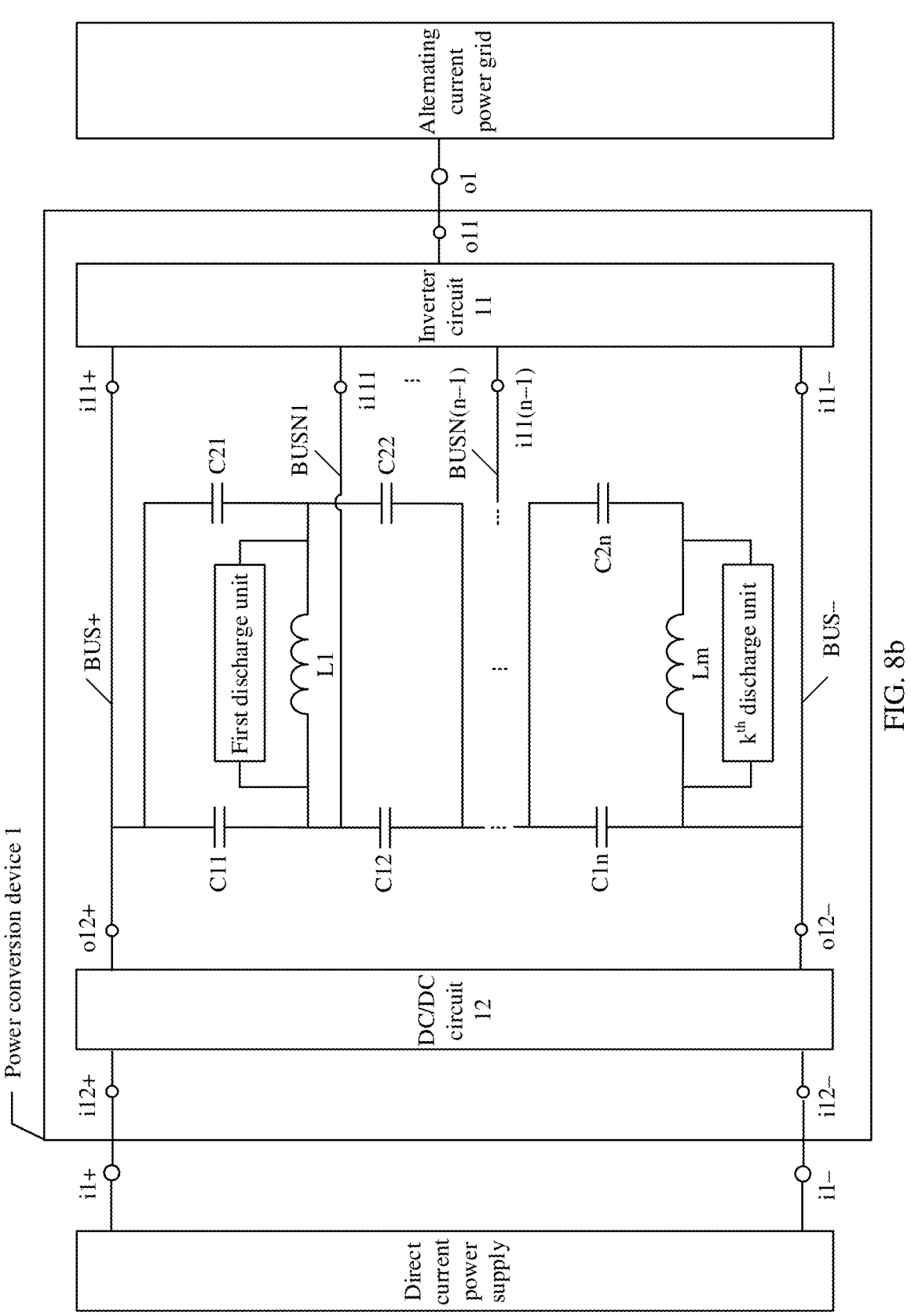
FIG. 8*b* is a schematic diagram of another structure of a power conversion device according.

FIG. 8*a* is a schematic diagram of another structure of a power conversion device according to the embodiments. As shown in FIG. 8*a*, a power conversion device 1 is an N-level power conversion device. For ease of description, the following describes the N-level power conversion device by using an example in which a capacitor connected in series between a positive direct current bus BUS+ and a negative direct current bus BUS− is a thin film capacitor, and a capacitor connected in series to an inductor is an electrolytic capacitor.

The N-level power conversion device includes: the positive direct current bus BUS+; the negative direct current bus BUS−; (n−1) direct current neutral wires; a first thin film capacitor C11, a second thin film capacitor C12, . . . , and an nth thin film capacitor C1*n*; a first electrolytic capacitor C21, a second electrolytic capacitor C22, . . . , and an nth electrolytic capacitor C2*n*; a first inductor L1, . . . , and an mth inductor Lm; a first discharge unit, . . . , and a kth discharging unit; and an inverter circuit 11 (such as an N-level inverter circuit 11). The (n−1) direct current neutral wires include a direct current neutral wire BUSN1, . . . , and a direct current neutral wire BUSN(n−1). N=n+1, n≥3, 1≤m≤n, 1≤k≤m, where n, m, and k are integers.

The first thin film capacitor C11, the second thin film capacitor C12, . . . , and the nth thin film capacitor C1*n* are connected in series and then connected between the positive direct current bus BUS+ and the negative direct current bus BUS−. For ease of description, a thin film capacitor and an electrolytic capacitor corresponding to the thin film capacitor are considered as a capacitor unit in the following. For example, the first thin film capacitor C11 and the first electrolytic capacitor C21 corresponding to the first thin film capacitor C11 serve as a first capacitor unit. The nth thin film capacitor C1*n* and the nth electrolytic capacitor C2*n* corresponding to the nth thin film capacitor C1*n* serve as an nth capacitor unit. At least one capacitor unit in the n capacitor units includes one inductor. After the inductor is connected in series to an electrolytic capacitor in the capacitor unit in which the inductor is located, the inductor is connected in parallel to a thin film capacitor in the capacitor unit in which the inductor is located. A relationship between the inductor and the capacitor unit may be a one-to-one relationship, or may be a one-to-two relationship. For example, as shown in FIG. 8*a*, the first electrolytic capacitor C21 is connected in series to the first inductor L1 and then connected in parallel to the first thin film capacitor C11, the second electrolytic capacitor C22 is connected in series to the first inductor L1 and then connected in parallel to the second thin film capacitor C12, . . . , and the nth electrolytic capacitor C2*n* is connected in series to the mth inductor Lm and then connected in parallel to the nth thin film capacitor C1*n*. It is clear that the first inductor L1 corresponds to the first capacitor unit and the second capacitor unit (a unit formed by the second thin film capacitor C12 and the second electrolytic capacitor C22), and a correspondence between the mth inductor Lm and the nth capacitor unit is one-to-one. The first discharge unit is connected in parallel to the first inductor L1, . . . , and the kth discharging unit is connected in parallel to the mth inductor Lm.

A first input terminal i11+ and a second input terminal i11− of the inverter circuit 11 are respectively connected to input terminals i1+ and i1− of the power conversion device 1 by using the positive direct current bus BUS+ and the negative direct current bus BUS−. A third input terminal il11 of the inverter circuit 11 is connected to a connection point between the first thin film capacitor C11 and the second thin film capacitor C12 by using the direct current neutral wire BUSN1, . . . , and an (n+1)th input terminal il11(*n*−1) of the inverter circuit 11 is connected to a connection point between the (n−1)th thin film capacitor and the nth thin film capacitor C1*n* by using the direct current neutral wire BUSN(n−1).

In an optional implementation, after a differential mode lightning strike is generated between the input terminals i1+ and i1− of the power conversion device 1, because of existence of the m inductors, most of a differential mode lightning strike current flows into the n thin film capacitors at first, so that a bus voltage starts to increase. For ease of description, a circuit structure in which an electrolytic capacitor is connected in series to an inductor and then connected in parallel to a thin film capacitor is considered as a filter unit in the following. For example, a circuit structure in which the first electrolytic capacitor C21 is connected in series to the first inductor L1 and then connected in parallel to the first thin film capacitor C11 is a first filter unit. When a voltage of an inductor that is connected in parallel to each discharge unit in the k discharge units is greater than an action voltage threshold corresponding to each discharge unit, each discharge unit releases lightning strike charges in a thin film capacitor of a filter unit in which the discharge unit is located to an electrolytic capacitor of the filter unit in which the discharge unit is located. For example, when a voltage of the first inductor L1 (such as a voltage difference between a voltage of the first thin film capacitor C11 and a voltage of the first electrolytic capacitor C21, or a voltage difference between a voltage of the second thin film capacitor C12 and a voltage of the second electrolytic capacitor C12) is greater than a first action voltage threshold, the first discharge unit is broken down and is in a conducted state, lightning strike charges in the first thin film capacitor C11 are released to the first electrolytic capacitor C21 by using the first discharge unit, and lightning strike charges in the second thin film capacitor C12 are released to the second electrolytic capacitor C22 by using the first discharge unit. In addition, when a voltage of the mth inductor Lm (such as a voltage difference between a voltage of the nth thin film capacitor C1$n$ and a voltage of the nth electrolytic capacitor C2$n$) is greater than an action voltage threshold of the kth discharge unit, the kth discharge unit is broken down and is in a conducted state, and lightning strike charges in the nth thin film capacitor C1$n$ are released to the nth electrolytic capacitor C2$n$ by using the kth discharge unit. Because a capacitance value of a thin film capacitor in a filter unit in which each discharge unit is located is less than a capacitance value of an electrolytic capacitor in the filter unit in which each discharge unit is located, for the thin film capacitor and the electrolytic capacitor in the same filter unit, a voltage change amount generated by a same amount of charges in an electrolytic capacitor with a larger capacitance value is smaller. Therefore, a case in which a bus voltage increases rapidly due to a differential mode lightning strike current can be effectively avoided, to resolve a problem that a semiconductor device in the power conversion device 1 has a risk of voltage overstress caused by the rapid increase of the bus voltage. In addition, an action voltage threshold of each discharge unit is greater than a voltage of an inductor connected in parallel to each discharge unit when the power conversion device 1 is in a first working state. The first working state may be understood as a normal working state, and a working parameter of the power conversion device 1 in the normal working state is within a preset working parameter range. Therefore, it can be ensured that each discharge unit is in a cut-off state when the power conversion device 1 is in the normal working state. Then, when a voltage of an inductor connected in parallel to a discharging unit is less than a cut-off voltage threshold, the discharging unit restores to a cut-off state. In this case, the inductor connected in parallel to the discharging unit is basically saturated, and a voltage of a thin film capacitor of a filter unit in which the discharging unit is located and a voltage of an electrolytic capacitor of the filter unit in which the discharging unit is located increase synchronously.

It should be noted that FIG. 8$a$ is a schematic diagram of a structure of a power conversion device by using an example in which the first thin film capacitor is C11 and the kth discharge unit is connected in parallel to two ends of the mth inductor Lm. Actually, the first thin film capacitor may be any capacitor of the n thin film capacitors, and (k–1) discharge units except the first discharge unit may be connected in parallel to two ends of any (k–1) inductors except the first inductor L1 in the m inductors, where the (k–1) discharge units are in a one-to-one correspondence with the (k–1) inductors.

In this embodiment, one discharge unit is connected in parallel to two ends of at least one of the m inductors, so that in a process in which the differential mode lightning strike current flows into the n thin film capacitors that are connected in series to make a bus voltage increase, and lightning strike charges in a thin film capacitor of a filter unit in which the discharge units are located are released to an electrolytic capacitor of the filter unit in which the discharge units are located by using each discharge unit. A capacitance value of a thin film capacitor in a filter unit in which each discharge unit is located is less than a capacitance value of an electrolytic capacitor in the filter unit in which each discharge unit is located. For a thin film capacitor and an electrolytic capacitor in the same filter unit, a voltage change amount generated when a same amount of charges flows into an electrolytic capacitor with a larger capacitance value is smaller. Therefore, a case in which a bus voltage increases rapidly due to a differential mode lightning strike current can be effectively avoided, to resolve a problem that a semiconductor device in the power conversion device 1 has a risk of voltage overstress caused by the rapid increase of the bus voltage. In addition, the power conversion device 1 is also applicable to a multi-level structure in which a quantity of levels is greater than or equal to 4, so that the power conversion device 1 has various structure, high flexibility, and high applicability.

Further, the power conversion device 1 shown in FIG. 8$a$ may further include a DC/DC circuit 12. For details, refer to a power conversion device 1 shown in FIG. 8$b$. As shown in FIG. 8$b$, the power conversion device 1 further includes the DC/DC circuit 12. A first input terminal i11+ and a second input terminal i11– of an inverter circuit 11 are respectively connected to input terminals i1+ and i1– of the power conversion device 1 by firstly using a positive direct current bus BUS+ and a negative direct current bus BUS–, and secondly using the DC/DC circuit 12.

Herein, for a working principle of the power conversion device 1 shown in FIG. 8$b$, refer to descriptions of corresponding parts in the power conversion device 1 shown in FIG. 8$a$. Details are not described herein again.

In this embodiment, one discharge unit is connected in parallel to two ends of at least one of the m inductors, so that in a process in which the differential mode lightning strike current flows into the n thin film capacitors that are connected in series to make a bus voltage increase, and lightning strike charges in a thin film capacitor of a filter unit in which the discharge units are located are released to an electrolytic capacitor of the filter unit in which the discharge units are located by using each discharge unit. A capacitance value of a thin film capacitor in a filter unit in which each discharge unit is located is less than a capacitance value of an electrolytic capacitor in the filter unit in which each discharge unit is located. For a thin film capacitor and an electrolytic capacitor in the same filter unit, a voltage change amount generated when a same amount of charges flows into an electrolytic capacitor with a larger capacitance value is smaller. Therefore, a case in which a bus voltage increases rapidly due to a differential mode lightning strike current can be effectively avoided, to resolve a problem that a semiconductor device in the power conversion device 1 has a risk of voltage overstress caused by the rapid increase of the bus voltage. In addition, the power conversion device 1 is also applicable to a multi-level structure in which a quantity of levels is greater than or equal to 4. The power conversion device 1 may further include a DC/DC circuit, so that the power conversion device 1 has various functions and structures, and high applicability.

FIG. 8$c$ is a schematic diagram of another structure of a power conversion device according to the embodiments. As shown in FIG. 8$c$, compared with that in the power conversion device 1 shown in FIG. 8$a$, (n–1) direct current neutral wires in the power conversion device 1 shown in FIG. 8$c$ are connected in a different manner. For example, a first input terminal i11+, a second input terminal i11–, a third input terminal i111, . . . , and a (n+1)th input terminal i11($n$–1) of an inverter circuit 11 are respectively connected to input terminals i1+, i1–, i11, . . . , and i1($n$–1) of the power conversion device 1 by using a positive direct current bus BUS+, a negative direct current bus BUS–, a direct current neutral wire BUSN1, . . . , and a direct current neutral wire BUSN($n$–1). A connection point between a first thin film capacitor C11 and a second thin film capacitor C12 is connected to the direct current neutral wire BUSN1, ..., and a connection point between a (n−1)th thin film capacitor C1(n−1) and an nth thin film capacitor C1n is connected to the direct current neutral wire BUSN(n−1). Herein, for a connection relationship of other circuit elements in the power conversion device 1 except the (n−1) direct current neutral wires, refer to descriptions of corresponding parts in the power conversion device 1 shown in FIG. 8a. Details are not described herein again.

Optionally, the power conversion device 1 further includes a DC/DC circuit 12. For details, refer to a power conversion device 1 shown in FIG. 8d. As shown in FIG. 8d, after a first input terminal i11+, a second input terminal i11−, a third input terminal i111, ..., and an (n+1)th input terminal i11(n−1) of an inverter circuit 11 are respectively connected to input terminals i1+, i1−, i111, ..., and i1(n−1) of the power conversion device 1 by firstly using a positive direct current bus BUS+, a negative direct current bus BUS−, a direct current neutral wire BUSN1, ..., and a direct current neutral wire BUSN(n−1), and secondly using the DC/DC circuit 12.

Figure 8C:
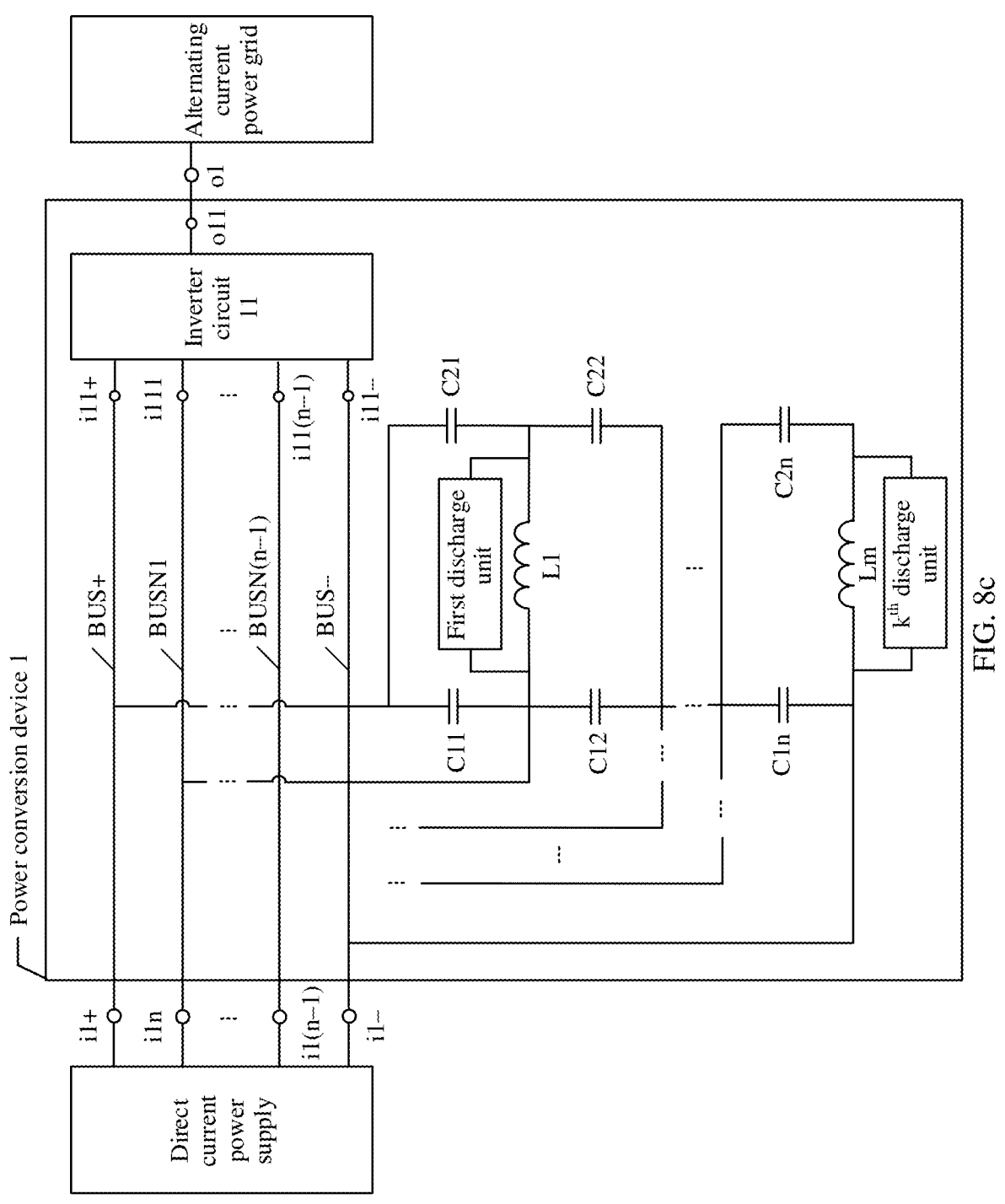
FIG. 8*c* is a schematic diagram of another structure of a power conversion device according.
Figure 8D:
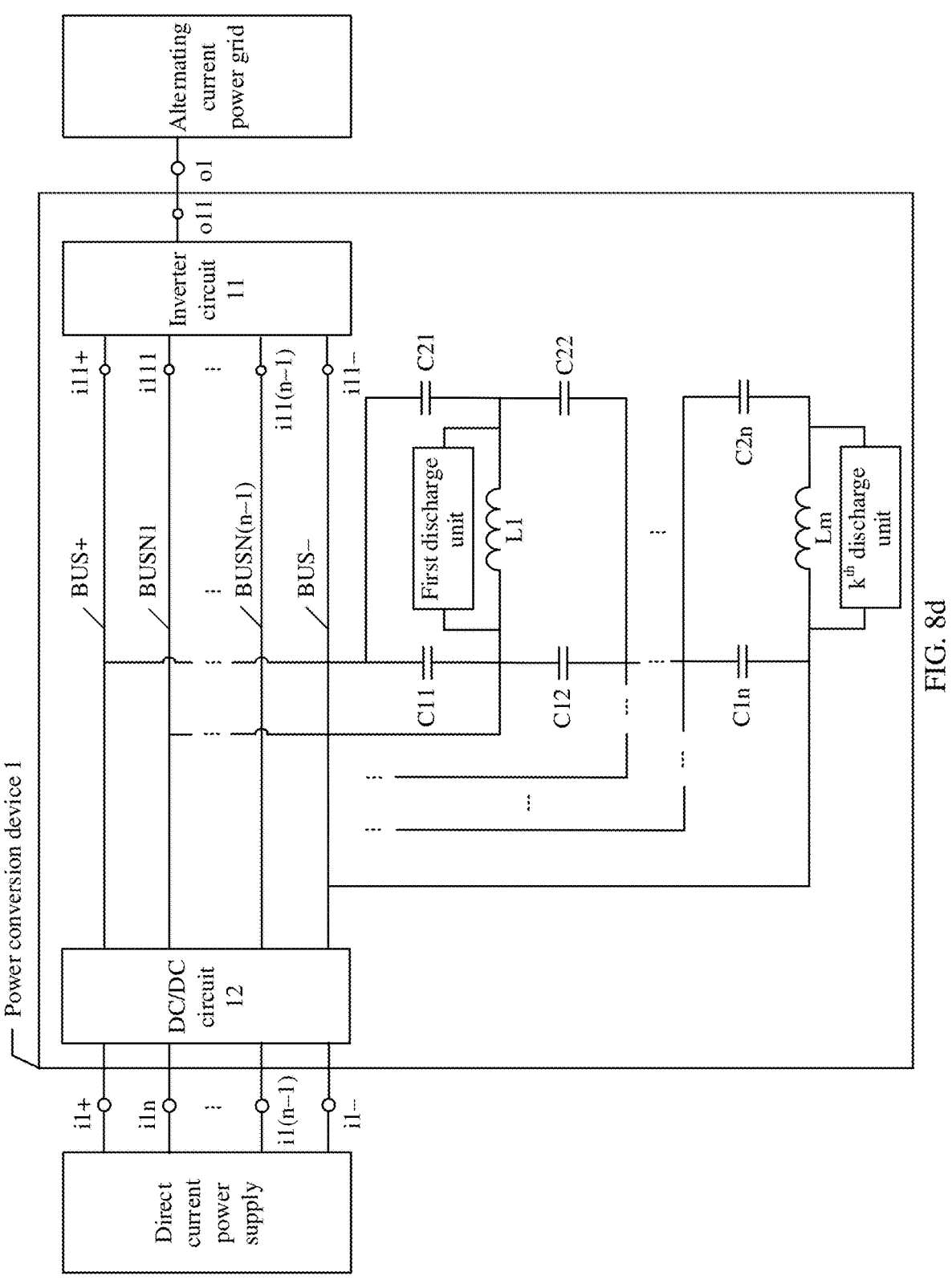
FIG. 8*d* is a schematic diagram of still another structure of a power conversion device according.

Herein, for working principles of the power conversion devices 1 shown in FIG. 8c and FIG. 8d, refer to descriptions of corresponding parts of the power conversion device 1 shown in FIG. 8a. Details are not described herein again.

In this embodiment, one discharge unit is connected in parallel to two ends of at least one of the m inductors, so that in a process in which a differential mode lightning strike current flows into n thin film capacitors that are connected in series to make a bus voltage increase, and lightning strike charges in a thin film capacitor of a filter unit in which the discharge units are located are released to an electrolytic capacitor of the filter unit in which the discharge units are located by using each discharge unit. A capacitance value of a thin film capacitor in a filter unit in which each discharge unit is located is less than a capacitance value of an electrolytic capacitor in the filter unit in which each discharge unit is located. For a thin film capacitor and an electrolytic capacitor in the same filter unit, a voltage change amount generated when a same amount of charges flows into an electrolytic capacitor with a larger capacitance value is smaller. Therefore, a case in which a bus voltage increases rapidly due to a differential mode lightning strike current can be effectively avoided, to resolve a problem that a semiconductor device in the power conversion device 1 has a risk of voltage overstress caused by the rapid increase of the bus voltage. In addition, the power conversion device 1 is also applicable to a multi-level structure in which a quantity of levels is greater than or equal to 4. The (n−1) direct current neutral wires in the power conversion device 1 are connected in various manners, so that the power conversion device 1 has various structures and high flexibility.

The foregoing descriptions are merely implementations of the embodiments, but are not intended to limit their scope. Any change amount or replacement readily figured out by a person skilled in the art shall fall within the scope of the embodiments.

The invention claimed is:

1. A power conversion device, comprising:
   a positive direct current bus;
   a negative direct current bus;
   an inverter circuit, wherein an input terminal of the inverter circuit is connected to an input terminal of the power conversion device separately using the positive direct current bus and the negative direct current bus, and an output terminal of the inverter circuit is connected to an output terminal of the power conversion device;
   a first capacitor connected between the positive direct current bus and the negative direct current bus;
   a second capacitor is connected in series to a first inductor and then connected in parallel to the first capacitor, wherein a capacitance value of the second capacitor is greater than a capacitance value of the first capacitor; and
   a first discharge unit connected in parallel to the first inductor, and configured to be in a conducted state when a voltage of the first inductor is greater than a first action voltage threshold.

2. The power conversion device according to claim 1, further comprising a third capacitor, a fourth capacitor, and a second inductor, wherein
   the first capacitor and the third capacitor are connected in series and then connected between the positive direct current bus and the negative direct current bus; and
   the fourth capacitor is connected in series to the second inductor and then connected in parallel to the third capacitor, wherein a capacitance value of the fourth capacitor is greater than a capacitance value of the third capacitor.

3. The power conversion device according to claim 2, further comprising a second discharge unit connected in parallel to the second inductor, and configured to be in a conducted state when a voltage of the second inductor is greater than a second action voltage threshold.

4. The power conversion device according to claim 3, further comprising a direct current neutral wire; and
   the input terminal of the inverter circuit is connected to the input terminal of the power conversion device separately using the positive direct current bus, the direct current neutral wire, and the negative direct current bus, and a connection point between the first capacitor and the third capacitor is connected to the direct current neutral wire.

5. The power conversion device according to claim 3, further comprising a direct current neutral wire, and the input terminal of the power conversion device comprises a first input terminal, a second input terminal, and a third input terminal; and
   a first input terminal and a second input terminal of the inverter circuit are connected to the input terminal of the power conversion device separately using the positive direct current bus and the negative direct current bus, and a connection point between the first capacitor and the third capacitor is connected to a third input terminal of the inverter circuit using the direct current neutral wire.

6. The power conversion device according to claim 3, wherein the second discharge unit comprises a gas discharge tube, a varistor, or a transient suppression diode.

7. The power conversion device according to claim 3, wherein the first action voltage threshold is greater than a voltage of the first inductor when the power conversion device is in a first working state, and a working parameter of the power conversion device in the first working state is within a preset working parameter range.

8. The power conversion device according to claim 3, wherein the second action voltage threshold is greater than a voltage of the second inductor when the power conversion device is in the first working state, and the working parameter of the power conversion device in the first working state is within the preset working parameter range.

9. The power conversion device according to claim 2, further comprising a direct current neutral wire; and the input terminal of the inverter circuit is connected to the input terminal of the power conversion device separately using the positive direct current bus, the direct current neutral wire, and the negative direct current bus, and a connection point between the first capacitor and the third capacitor is connected to the direct current neutral wire.

10. The power conversion device according to claim 9, wherein the second action voltage threshold is greater than a voltage of the second inductor when the power conversion device is in the first working state, and the working parameter of the power conversion device in the first working state is within the preset working parameter range.

11. The power conversion device according to claim 2, further comprising a direct current neutral wire, and the input terminal of the power conversion device comprises a first input terminal, a second input terminal, and a third input terminal; and a first input terminal and a second input terminal of the inverter circuit are connected to the input terminal of the power conversion device separately using the positive direct current bus and the negative direct current bus, and a connection point between the first capacitor and the third capacitor is connected to a third input terminal of the inverter circuit using the direct current neutral wire.

12. The power conversion device according to claim 11, wherein the second action voltage threshold is greater than a voltage of the second inductor when the power conversion device is in the first working state, and the working parameter of the power conversion device in the first working state is within the preset working parameter range.

13. The power conversion device according to claim 2, wherein the first action voltage threshold is greater than a voltage of the first inductor when the power conversion device is in a first working state, and a working parameter of the power conversion device in the first working state is within a preset working parameter range.

14. The power conversion device according to claim 1, further comprising a third capacitor and a fourth capacitor, wherein the first capacitor and the third capacitor are connected in series and then connected between the positive direct current bus and the negative direct current bus; and the fourth capacitor is connected in series to the first inductor and then connected in parallel to the third capacitor, wherein a capacitance value of the fourth capacitor is greater than a capacitance value of the third capacitor.

15. The power conversion device according to claim 14, further comprising a direct current neutral wire; and the input terminal of the inverter circuit is connected to the input terminal of the power conversion device separately using the positive direct current bus, the direct current neutral wire, and the negative direct current bus, and a connection point between the first capacitor and the third capacitor is connected to the direct current neutral wire.

16. The power conversion device according to claim 14, further comprising a direct current neutral wire, and the input terminal of the power conversion device comprises a first input terminal, a second input terminal, and a third input terminal; and a first input terminal and a second input terminal of the inverter circuit are connected to the input terminal of the power conversion device separately using the positive direct current bus and the negative direct current bus, and a connection point between the first capacitor and the third capacitor is connected to a third input terminal of the inverter circuit using the direct current neutral wire.

17. The power conversion device according to claim 14, wherein the first action voltage threshold is greater than a voltage of the first inductor when the power conversion device is in a first working state, and a working parameter of the power conversion device in the first working state is within a preset working parameter range.

18. The power conversion device according to claim 1, wherein the first discharge unit comprises a gas discharge tube, a varistor, or a transient suppression diode.

19. The power conversion device according to claim 1, wherein the first action voltage threshold is greater than a voltage of the first inductor when the power conversion device is in a first working state, and a working parameter of the power conversion device in the first working state is within a preset working parameter range.

20. The power conversion device according to claim 1, wherein the power conversion device further comprises a direct current/direct current (DC/DC) circuit, an input terminal of the DC/DC circuit is connected to the input terminal of the power conversion device, and an output terminal of the DC/DC circuit is connected to the input terminal of the inverter circuit using the positive direct current bus and the negative direct current bus.

* * * * *